United States Patent
Ichieda

(10) Patent No.: US 9,645,678 B2
(45) Date of Patent: May 9, 2017

(54) DISPLAY DEVICE, AND METHOD OF CONTROLLING DISPLAY DEVICE

(71) Applicant: Seiko Epson Corporation, Tokyo (JP)

(72) Inventor: Hiroyuki Ichieda, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 49 days.

(21) Appl. No.: 14/105,507

(22) Filed: Dec. 13, 2013

(65) Prior Publication Data
US 2014/0168168 A1    Jun. 19, 2014

(30) Foreign Application Priority Data

Dec. 18, 2012 (JP) ................................. 2012-275400
Sep. 6, 2013 (JP) ................................. 2013-184770

(51) Int. Cl.
*G06F 3/042* (2006.01)
*G06F 3/0481* (2013.01)

(52) U.S. Cl.
CPC ............ *G06F 3/042* (2013.01); *G06F 3/0425* (2013.01); *G06F 3/0481* (2013.01)

(58) Field of Classification Search
CPC ...... G06F 3/0425; G06F 3/0386; G06F 3/005; G06F 3/042; G06F 3/0304; G03B 21/26; G03B 21/00
See application file for complete search history.

(56) References Cited

U.S. PATENT DOCUMENTS

| | | | |
|---|---|---|---|
| 8,330,714 B2* | 12/2012 | Nozaki | G03B 17/48 345/156 |
| 8,610,664 B2* | 12/2013 | Kneissler | G06F 3/0317 345/156 |
| 8,933,880 B2 | 1/2015 | Takamatsu et al. | |
| 9,063,694 B2* | 6/2015 | Sirpal | G06F 1/1616 |
| 9,294,747 B2 | 3/2016 | Tanabe | |
| 2004/0130568 A1* | 7/2004 | Nagano | G06F 3/1454 715/733 |
| 2006/0238517 A1* | 10/2006 | King et al. | 345/173 |
| 2011/0119638 A1* | 5/2011 | Forutanpour | G06F 3/03542 715/863 |
| 2011/0209058 A1* | 8/2011 | Hinckley | G06F 3/04883 715/702 |
| 2011/0209099 A1* | 8/2011 | Hinckley et al. | 715/863 |
| 2011/0267260 A1* | 11/2011 | Jang et al. | 345/156 |
| 2011/0267315 A1* | 11/2011 | Nakanishi | G01B 11/002 345/175 |

(Continued)

FOREIGN PATENT DOCUMENTS

JP          11212724 A   *  8/1999  ............ G06F 3/033
JP       2004-272433 A      9/2004

(Continued)

*Primary Examiner* — Priyank Shah
(74) *Attorney, Agent, or Firm* — ALG Intellectual Property, LLC

(57) ABSTRACT

A display device includes a projection unit adapted to display an image on a screen, a position detection unit adapted to detect a pointed position of a pointing body in the screen, and a control section adapted to perform a function related to an operation corresponding to an operation area in a case in which the operation area is disposed outside a display area of the image in the screen, and the pointed position detected by the position detection section is located within the operation area.

14 Claims, 11 Drawing Sheets

(56) References Cited

U.S. PATENT DOCUMENTS

| | | |
|---|---|---|
| 2011/0298724 A1* | 12/2011 | Ameling et al. ............... 345/173 |
| 2012/0030595 A1* | 2/2012 | Itahana ............... G06F 3/04817 |
| | | 715/765 |
| 2012/0081304 A1* | 4/2012 | Sirpal ................... G06F 1/1616 |
| | | 345/173 |
| 2012/0081322 A1* | 4/2012 | Sirpal et al. ................... 345/173 |
| 2012/0113149 A1* | 5/2012 | Tanabe ................. H04N 9/3188 |
| | | 345/660 |
| 2012/0182216 A1* | 7/2012 | Takamatsu et al. .......... 345/157 |
| 2013/0176232 A1* | 7/2013 | Waeller ......................... 345/173 |
| 2014/0160076 A1* | 6/2014 | Ichieda ................. G06F 3/0425 |
| | | 345/175 |

FOREIGN PATENT DOCUMENTS

| | | |
|---|---|---|
| JP | 2005-122271 A | 5/2005 |
| JP | 2005-141151 A | 6/2005 |
| JP | 2008-03802 A | 1/2008 |
| JP | 2009-099067 A | 5/2009 |
| JP | 2012-098621 A | 5/2012 |
| JP | 2012-160175 A | 8/2012 |
| WO | WO-2012-044775 A | 4/2012 |

\* cited by examiner

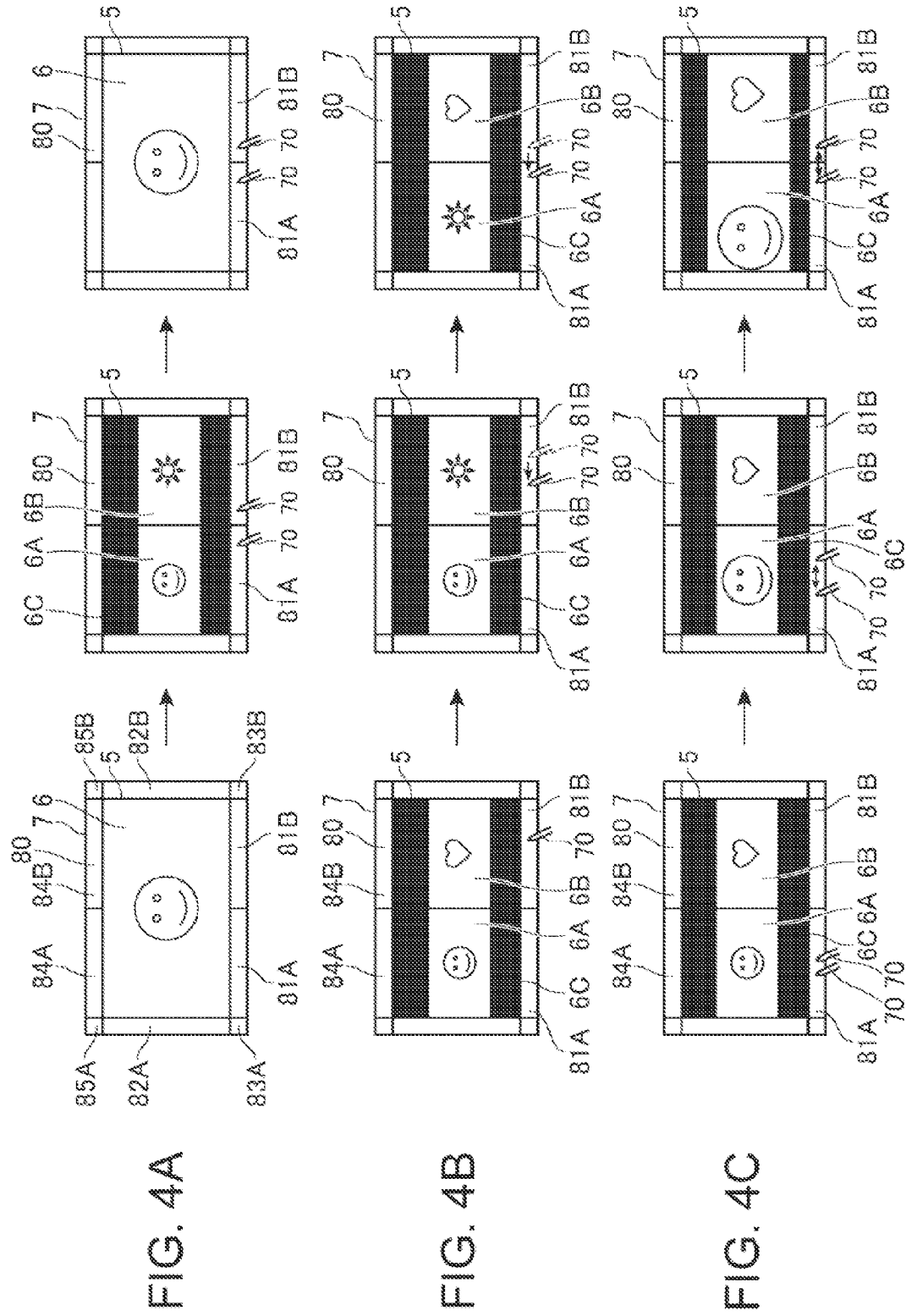

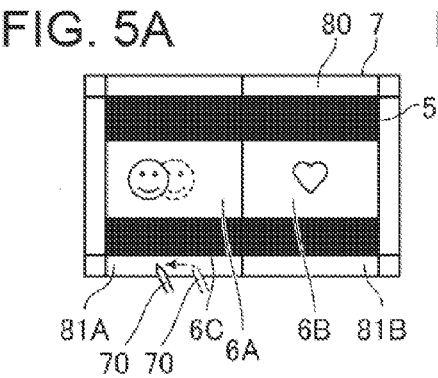
FIG. 5A
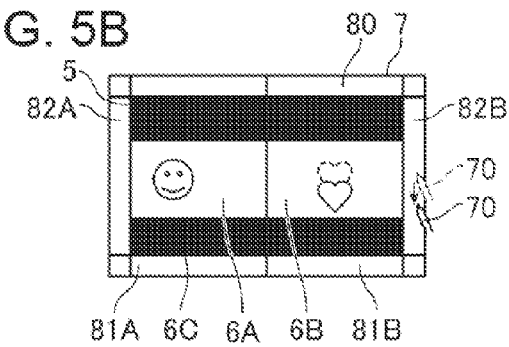
FIG. 5B
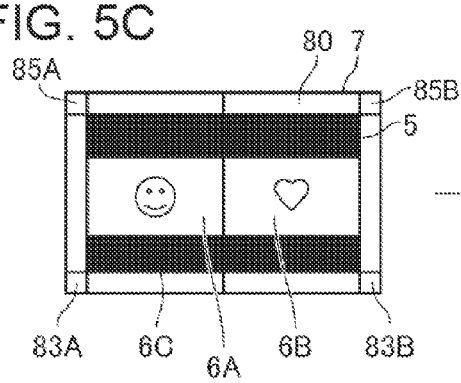
FIG. 5C
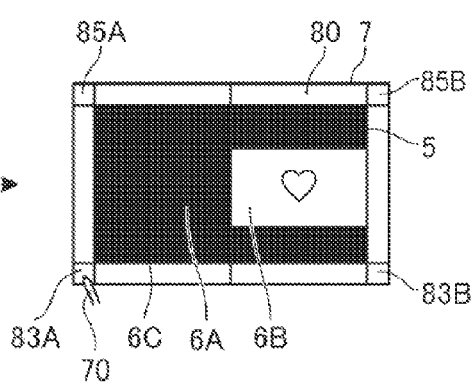
FIG. 5D
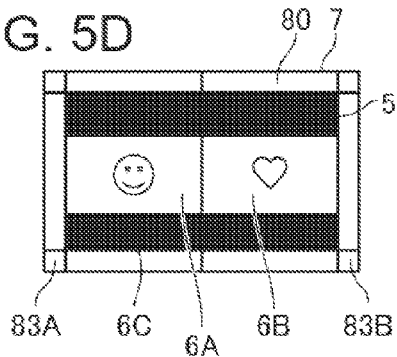
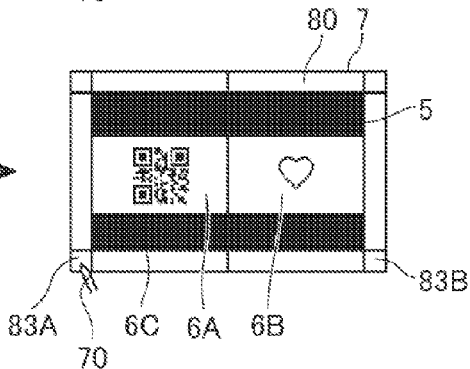
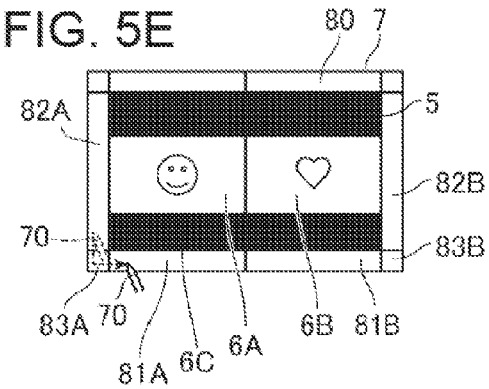
FIG. 5E

| MARK | FUNCTION |
|---|---|
| ○ | SOURCE SWITCHING FUNCTION |
| △ | ZOOM FUNCTION |
| □ | MUTE FUNCTION |
| × | FREEZE FUNCTION |
| ⇔ | DISPLAY POSITION CHANGING FUNCTION |
| ☆ | MODE SWITCHING FUNCTION |

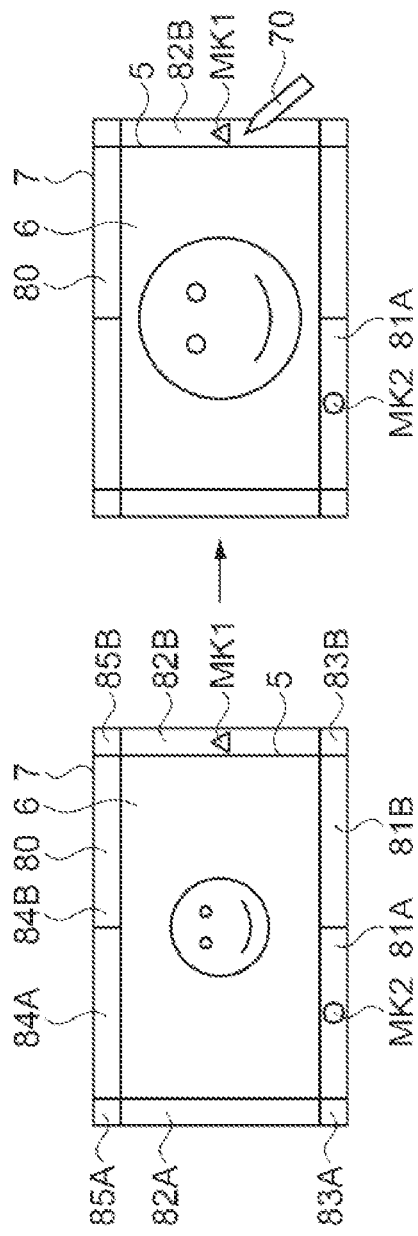
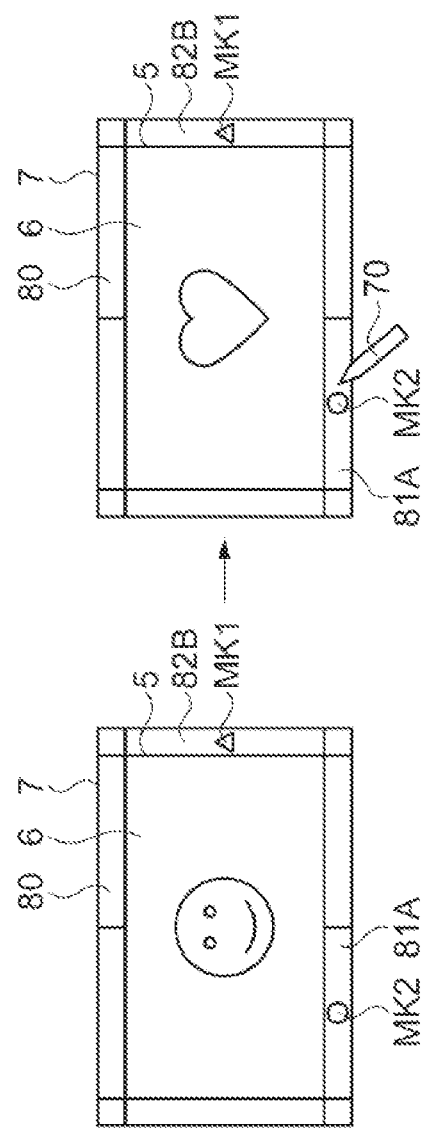
FIG. 10A
FIG. 10B

DISPLAY DEVICE, AND METHOD OF CONTROLLING DISPLAY DEVICE

The entire disclosure of Japanese Patent Application Nos. 2012-275400, filed Dec. 18, 2012 and 2013-184770, filed Sep. 6, 2013 are expressly incorporated by reference herein.

BACKGROUND

1. Technical Field

The present invention relates to a display device for displaying an image on a display surface, and a method of controlling a display device.

2. Related Art

In the past, there has been known a device, which detects a specific position of an image displayed by a display device such as a projector, and then displays a pointer or the like so as to correspond to the position thus detected when the indication position is pointed by a pointing body (see, e.g., JP-A-2004-272433). In the device of this kind, when detecting the position pointed, the image displayed on a display surface is controlled by for example displaying the pointer so as to correspond to the position thus pointed, and then drawing and displaying an image showing the trajectory of the pointed position.

However, in order to control the display device to perform a variety of functions of the display device, there has been required to perform the control using operation buttons provided to the display device main body, a remote controller for remotely controlling the display device, and so on. Therefore, the user is required to use the pointing body for controlling the display image and the remote controller for controlling the display device while switching between the pointing body and the remote controller.

SUMMARY

An advantage of some aspects of the invention is to solve the problem of the related art mentioned above to thereby achieve improvement of the operability in performing a variety of functions of a display device.

An aspect of the invention is directed to a display device including a display adapted to display an image on a display surface, a detector adapted to detect an operation position in the display surface, and a controller adapted to perform a function related to an operation corresponding to an operation area in a case in which the operation area is disposed outside a display area of the image in the display surface, and the operation position detected by the detector is located within the operation area.

According to this configuration, by the operation in the operation area on the display surface, the function of the display device corresponding to the operation area on which the operation is performed can be performed, and thus, the operability of the operation for performing a variety of functions of the display device can be improved.

Another aspect of the invention is directed to the display device described above, which further includes a display controller adapted to display image data supplied from a plurality of image supply sections including an external device respectively in a plurality of display areas disposed in the display surface using the display, and wherein a plurality of the operation areas is set so as to correspond to each of the display areas.

According to this configuration, in the case of displaying the image data supplied from a plurality of image supply sections on the plurality of display areas, the variety of types of functions of the display device to each of the images can be performed with the operation in the operation area on the display surface, and improvement in operability can be achieved.

Another aspect of the invention is directed to the display device described above, wherein in a case in which a plurality of the operation areas is set, and the detector detects an operation straddling two or more of the operation areas, the function corresponding to the operation straddling the two or more of the operation areas is performed.

According to this configuration, a variety of functions provided to the display device can be performed with the operation straddling two or more operation areas. Therefore, it is possible to perform a wide variety of functions by making the functions correspond to the operations in the operation areas, and thus the further improvement in operability can be achieved.

Another aspect of the invention is directed to the display device described above, which further includes an imaging device adapted to shoot a range including the display area, wherein the detector detects the operation position based on a shot image of the imaging device, and the operation area is set within a shootable area of the imaging device.

According to this configuration, the operation position to the image displayed can promptly and accurately be detected.

Another aspect of the invention is directed to the display device described above, which further includes a recognition device adapted to recognize a pattern displayed in the operation area, and a setting device adapted to make function information, which corresponds to the pattern recognized by the recognition device, correspond to the operation area, wherein the controller performs a function based on the function information corresponding to the operation area in a case in which the operation position is located within the operation area.

According to this configuration, the pattern displayed in the operation area on the display surface is recognized. Then, the function of the display device corresponding to the pattern in the operation area on which the operation is performed can be performed.

Another aspect of the invention is directed to the display device described above, wherein the recognition device includes a pattern detector adapted to detect the pattern displayed in the operation area, a function storage adapted to store the function information corresponding to the pattern, and a function acquisition device adapted to obtain the function information, which corresponds to the pattern detected by the pattern detector, from the function storage.

According to this configuration, the function storage stores the function information made to correspond to the pattern. The function acquisition device obtains the function information corresponding to the pattern thus detected from the function storage. Thus, in the case in which the operation is performed in the operation area on which the pattern is displayed, it is possible to perform the function of the display device based on the pattern stored in the function storage and the function information.

Another aspect of the invention is directed to the display device described above, wherein in a case in which the operation position is located within the operation area where the pattern fails to be detected by the pattern detector, the controller avoids performing any function.

According to such a display device as described above, in the case in which the operation position is located in the operation area where no pattern is detected, no function is performed. Thus, it is possible to prevent the function from being erroneously performed even in the case in which the operation is performed in the operation area where no pattern exists.

Another aspect of the invention is directed to the display device described above, wherein in a case in which an operation to the operation area is detected by the detector, the controller performs at least either one of a switching function adapted to switch an image displayed in the display area to another image, a freeze function adapted to stop an image displayed, a mute function adapted to stop displaying an image, a zoom function adapted to magnify or contract an image displayed, a function adapted to change a display position of an image displayed in the display area, and a function adapted to switch between a mode of processing information representing the operation position detected by the detector inside the display device and a mode of outputting the information to an outside.

According to this configuration, a variety of types of functions provided to the display device can be operated with the operation to the operation area on the display surface without operating the operation panel or the remote controller of the display device, and thus, the improvement in operability can be achieved.

Still another aspect of the invention is directed to a method of controlling a display device adapted to display an image on a display surface including: detecting an operation position in the display surface, and performing a function related to an operation corresponding to an operation area in a case in which the operation area is disposed outside a display area of the image in the display surface, and the operation position detected in the detecting of an operation position is located within the operation area.

According to this configuration, by the operation in the operation area on the display surface, the function of the display device corresponding to the operation area on which the operation is performed can be performed, and thus, the operability of the operation for performing a variety of functions of the display device can be improved.

Another aspect of the invention is directed to the method of controlling a display device described above, and there are further included recognizing a pattern displayed in the operation area, and making function information, which corresponds to the pattern recognized in the recognizing of a pattern, correspond to the operation area, and in the performing of a function, a function based on the function information corresponding to the operation area is performed in a case in which the operation position is located within the operation area.

According to this configuration, the pattern displayed in the operation area on the display surface is recognized. Then, the function of the display device corresponding to the pattern in the operation area on which the operation is performed can be performed.

According to the above aspects of the invention, by the operation in the operation area on the display surface, the function of the display device corresponding to the operation area on which the operation is performed can be performed, and thus, the operability of the operation for performing a variety of functions of the display device can be improved.

BRIEF DESCRIPTION OF THE DRAWINGS

The invention will be described with reference to the accompanying drawings, wherein like numbers reference like elements.

FIGS. 4A through 4C are diagrams for explaining an arrangement example of an operation area on the screen, and an action of controlling the display in accordance with the operation, wherein FIG. 4A shows an example related to a display switching function, FIG. 4B shows an example related to a source switching function, and FIG. 4C shows an example related to a zoom function.

FIGS. 5A through 5E are diagrams for explaining the arrangement example of the operation area on the screen, and the action of controlling the display in accordance with the operation, wherein FIG. 5A shows an example related to a horizontal scrolling function, FIG. 5B shows an example related to a vertical scrolling function, FIG. 5C shows an example related to a mute function, FIG. 5D shows an example related to a network connection standby function, and FIG. 5E shows an example related to an operation locking/releasing function.

FIG. 7 is an explanatory diagram of a function table.

FIGS. 10A and 10B are diagrams for explaining an arrangement example of the operation area on the screen, and the action of controlling the display in accordance with the operation, wherein FIG. 10A shows an example related to the zoom function, and FIG. 4B shows an example related to the source switching function.

DESCRIPTION OF EXEMPLARY EMBODIMENTS

Embodiments to which the invention is applied will hereinafter be explained with reference to the accompanying drawings.

First Embodiment

Figure 1:
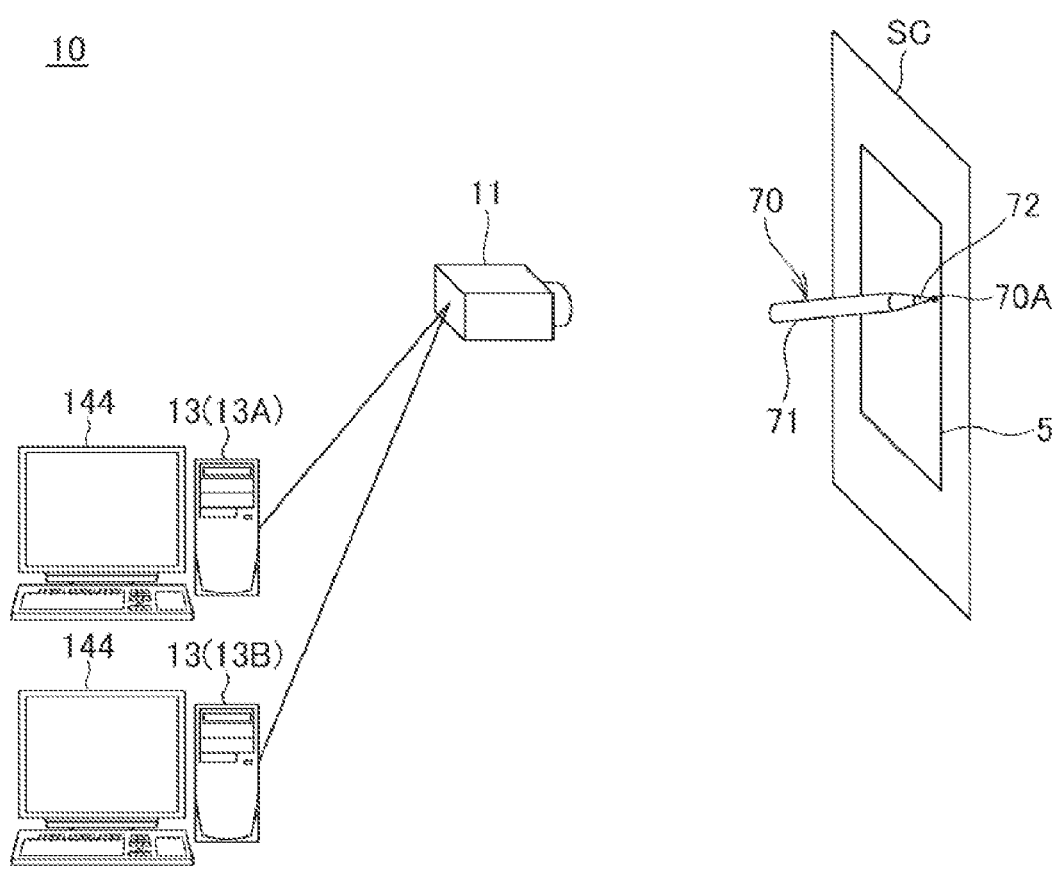
FIG. 1 is a diagram showing a configuration of a display system according to a first embodiment of the invention.

FIG. 1 is a diagram showing a configuration of a display system 10 using a projector 11 according to the first embodiment.

The projector 11 as a display device is connected to a personal computer (PC) 13 as an image supply section via an image signal cable or the like in a wired manner. The PC 13 has a monitor 144, and outputs image data of the image identical to the image, which is presently displayed on the monitor 144, to the projector 11, for example.

The projector 11 projects the display image on the screen SC as a projection surface (a display surface) based on the image data input to the projector 11. The image data input from the PC 13 can be either of moving image (video) data and still image data, and the projector 11 is capable of projecting either of the moving image and the still image based on the image data input to the projector 11. Further, the projector 11 is connected to the PC 13 via a communication line for transmitting a control signal such as a USB cable or a LAN cable in addition to the image signal cable and so on for transmitting the image data, and transmitting and receiving control data and so on with the PC 13 via the communication line. It should be noted that it is also possible to use a wireless communication line as the communication line for transmitting the control signal. Further, it is also possible to adopt a configuration of transmitting the image data and the control data superimposed with each other on a single cable connecting the PC 13 and the projector 11 to each other.

As the projection surface (the display surface), a wall surface itself can be used besides a curtain or a plate installed on the wall surface or a floor surface.

As shown in FIG. 1, the largest possible range (area) for the projector 11 to project an image on the screen SC is defined as a displayable area 5.

Further, although not shown in the drawings, it is also possible to connect image supply devices such as a DVD player or a video recorder to the projector 11 as the image supply sections besides the plurality of PC 13. Further, the projector 11 can also have a configuration incorporating the image supply sections. In other words, it is also possible to adopt a configuration of generating the image data to be projected by the projector 11 using the circuit incorporated in the projector 11.

The projector 11 is capable of performing single picture display for disposing a single display area in the displayable area 5 and displaying an image based on the image data input from a single image supply device, and multi-picture display for disposing a plurality of display areas 6 (see FIGS. 4A through 4C; hereinafter referred to as display areas 6A, 6B) and displaying the image data input from a plurality of image supply devices respectively on the plurality of display areas 6A, 6B.

In the display system 10, it is possible to perform the position pointing operation using a pointing body 70 on the screen SC. The pointing body 70 is, for example, a pen-shaped device, and the user uses the device while gripping a shaft section 71 of the pointing body 70 with the hand so as to press the tip of the device against the screen SC. The tip of the pointing body 70 is provided with an operation switch 72 for detecting the pressing operation, and in the case in which the user presses the tip of the pointing body 70 against the screen SC, the operation switch 72 is set to the ON state.

The projector 11 has a function of detecting the tip position of the pointing body 70 as a pointed position 70A. The projector 11 is capable of perform a process of processing the control data representing the coordinate of the pointed position 70A thus detected using a circuit incorporated in the projector 11, and then, for example, drawing an image based on the coordinate of the pointed position 70A thus detected. Further, the projector 11 is also capable of outputting the control data representing the coordinate of the pointed position 70A to the PC 13.

Further, in the case in which the user performs the operation of pressing the tip of the pointing body 70 against the screen SC on the screen SC, the projector 11 performs a variety of functions such as a source switching function, a freeze function, a mute function, and a zoom function. This action will be described later.

Figure 2:
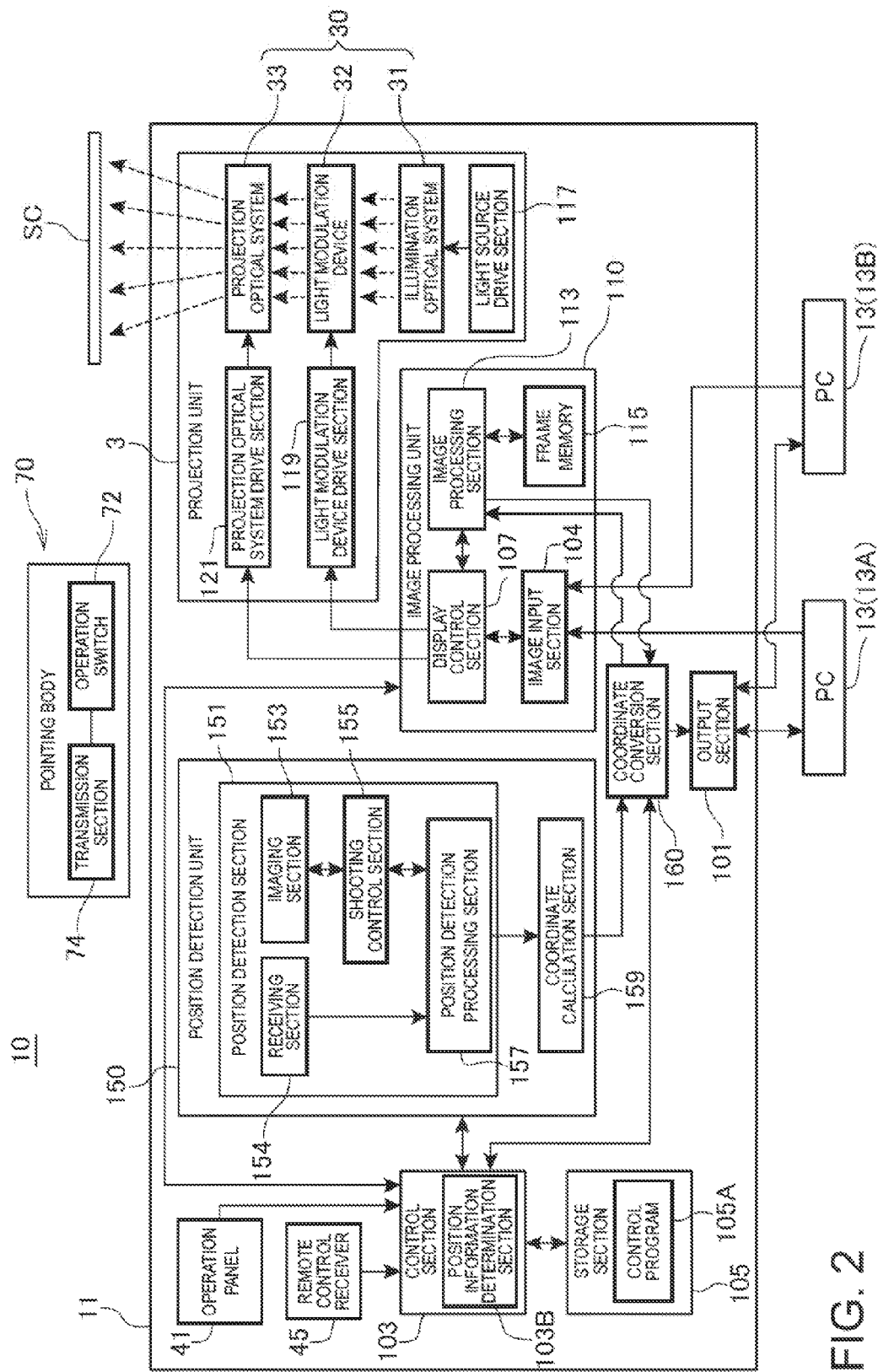
FIG. 2 is a functional block diagram of components constituting the display system.

FIG. 2 is a block diagram showing a functional configuration of the display system 10.

The projector 11 is provided with an image processing unit 110 for performing image processing for displaying an image on the screen SC based on the image data input from the PC 13, a projection unit (a display) 3 for projecting the image processed by the image processing unit 110 to the screen SC, a position detection unit (a position detector) 150 for detecting the pointed position 70A of the pointing body 70 on the screen SC, and a control section 103 for controlling these components.

The control section 103 is composed of a CPU, a non-volatile memory, a RAM, and so on not shown, and reads out and then executes a control program 105A stored in a storage section 105 connected to the control section 103 to thereby control each section of the projector 11. Further, the control section 103 performs the control program 105A stored in the storage section 105 to thereby perform a calibration for identifying a correspondence relationship between a position of the position detection unit 150 in a shooting range (a field angle), namely in shot image data, a position on an actual projection area, and a position on the image drawn by an image processing section 113. The control section 103 obtains coordinate conversion parameters to be used by a coordinate calculation section 159 based on the correspondence relationship between the positions on the shot image and the positions on the actual projection area identified by the calibration. The coordinate conversion parameters include, for example, the data for making the coordinate on the image drawn by the image processing section 113 and the coordinate obtained on the shot image data correspond to each other. The coordinate calculation section 159 is capable of converting the coordinate obtained on the shot image data into the coordinate on the image drawn by the image processing section 113 based on this coordinate conversion parameter. The calibration is performed basically by the projector 11 alone, and the projector 11 obtains the coordinate conversion parameters to manually or automatically make correspondence between the coordinate system of the actual projection area and the coordinate system of the shot image. When performing the coordinate calculation, the projector 11 converts the position on the shot image into the position on the actual projection area based on the coordinate conversion parameters thus obtained. The projector 11 performs the conversion between the coordinate on the image data input from the PC 13 and the coordinate on the actual projection area based on the information of the resolution of the image input from the PC 13 and the display position on the actual projection area. The storage section 105 is formed of a magnetic or optical recording device, or a semiconductor storage element, and stores a variety of types of programs including the control program 105A, and data such as various setting values.

An operation panel 41 as an operation section, and a remote control receiver 45 for detecting an operation of a remote controller as the operation section are connected to the control section 103.

The operation panel 41 is provided with a variety of types of switches and indicator lamps, and is disposed to an exterior housing (not shown) of the projector 11. When a switch of the operation panel 41 is operated, an operation signal corresponding to the switch thus operated is output to the control section 103.

The remote control receiver 45 receives an infrared signal transmitted by the remote controller (not shown) used by the user as the operator of the projector 11 in accordance with a button operation. The remote control receiver 45 demodulates and then decodes the infrared signal received from the remote controller, and then outputs the operation signal representing the operation in the remote controller to the control section 103.

It should be noted that the operation of the projector 11 can also be performed by the PC 13 besides the pointing body 70, the operation panel 41, and the remote controller.

On this occasion, the PC 13 outputs the control data for operating the projector 11, and functions as the operation section.

The control section 103 detects the operation of the user based on the operation signal input from the operation panel 41 or the remote control receiver 45, and then controls the projector 11 in accordance with this operation.

The projection section 30 is configured including an illumination optical system 31, a light modulation device 32 (a light modulator), and a projection optical system 33. The illumination optical system 31 is provided with a light source formed of, for example, a xenon lamp, a super-high pressure mercury lamp, or a light emitting diode (LED). Further, the illumination optical system 31 can also be provided with a reflector and an auxiliary reflector for guiding the light, which is emitted by the light source, to the light modulation device 32, a lens group (not shown) for improving the optical characteristics of the projection light, a polarization plate, or a photochromic element for reducing the light intensity of the light emitted by the light source.

The light modulation device 32 modulates the light from the illumination optical system 31 to form the image light. In the present embodiment, the case of configuring the light modulation device 32 using a transmissive liquid crystal panel will be cited as an example. In this configuration, the light modulation device 32 has three liquid crystal panels corresponding respectively to three primary colors of RGB, and the light emitted by the illumination optical system 31 is separated into colored lights of the three colors of RGB, and the colored lights respectively enter the corresponding liquid crystal panels. The colored lights, which have been modulated while passing through the respective liquid crystal panels, are combined by a combining optical system such as a cross dichroic prism, and are then output to the projection optical system 33.

The projection optical system 33 is provided with, for example, a lens or a lens group for performing magnification and contraction of the image to be projected and adjustment of the focus, a zoom controlling motor for driving the lens to control the level of the zoom, and a focus adjusting motor for performing the focus adjustment.

The projection unit 3 is provided with a projection optical system drive section 121, a light modulation device drive section 119, and a light source drive section 117 in addition to the projection section 30. The projection optical system drive section 121 drives the motors provided to the projection optical system 33 in accordance with the control by a display control section 107 of the image processing unit 110. The light modulation device drive section 119 drives the light modulation device 32 to perform drawing in accordance with the image signal output from the display control section 107. The light source drive section 117 drives the light source provided to the illumination optical system 31 in accordance with the control by the control section 103.

The image processing unit 110 is provided with an image input section 104 to be connected to the PC 13. The image input section 104 is an interface for the variety of types of image supply devices including the PC 13 to input the image data, and there can be used a general-purpose interface such as a DVI interface, a USB interface, a LAN interface, or an HDMI (registered trademark) interface. Further, it is also possible to input the image data to the image input section 104 using wireless communication. Further, it is also possible for the image input section 104 to be provided with an A/D converter circuit for converting an analog video signal into digital image data, and an analog video signal input terminal such as a VGA terminal. Further, it is also possible for the image input section 104 to be provided with a DisplayPort (trademark) interface, and in this case, the projector 11 can be connected to the DisplayPort provided to the PC 13 or a portable device having an equivalent function to the PC 13.

The image processing unit 110 is provided with the display control section 107 for processing the image data input via the image input section 104, and an image processing section 113 for developing the image on a frame memory 115 in accordance with the control of the display control section 107 to thereby generate the image to be projected by the projection section 30. The image processing section 113 functions as the image supply section incorporated in the projector 11.

The display control section 107 performs discrimination of the format (the frame rate, the resolution, and the compression state) of the image data input via the image input section 104, and so on to thereby determine the necessary process for displaying the display image on the light modulation device 32, and then controls the image processing section 113 to perform the process thus determined. The process performed here is, for example, frame rate conversion, interlace/progressive conversion, resolution conversion, a decompression process of the image data compressed, or format conversion of 3D image data. The image processing section 113 develops the image data input to the image input section 104 on the frame memory 115 in accordance with the control by the display control section 107, and then performs the variety of processes described above. The image processing section 113 generates the image signal with a predetermined format for displaying the image based on the image, which has been processed and drawn on the frame memory 115, and then outputs the image signal to the display control section 107. The display control section 107 outputs the image signal, which has been generated by the image processing section 113, to the light modulation device drive section 119.

Further, it is also possible for the image processing section 113 to perform various types of image processing such as a keystone correction, a color compensation corresponding to a color mode, and image magnification/contraction process in accordance with the control of the display control section 107. In other words, the control section 103 makes the display control section 107 perform the keystone correction and the magnification/contraction process of the display image based on the operation signal input from the operation panel 41 or the remote control receiver 45. The display control section 107 calculates the various types of parameters necessary for the keystone correction or the magnification/contraction process of the display image, and then controls the image processing section 113 to perform the keystone correction and the magnification/contraction process of the display image.

The pointing body 70 operated by the user is provided with the operation switch 72 described above, and a transmission section 74 for outputting a signal representing the operation state (ON/OFF) of the operation switch 72. The transmission section 74 transmits, for example, an infrared signal representing the ON/OFF state of the operation switch 72 using the method compliant with the IrDA standard.

The pointed position by the pointing body 70 is detected by the position detection unit 150 as described above. It should be noted that it is possible for the position detection unit 150 to have a configuration of detecting one type of pointing body 70, or a configuration capable of detecting a plurality of types of pointing body 70, for example, both of a pen-shaped operation device and the fingers of the user. In the case in which the position detection unit 150 is capable of detecting a plurality of types of pointing body 70, the position detection unit 150 can have a configuration capable of detecting the type of the pointing body 70.

The position detection unit 150 detects the operation state of the operation switch 72 based on the signal transmitted by the transmission section 74. Further, it is also possible for the position detection unit 150 to have a configuration of detecting whether or not the tip of the pointing body 70 has contact with the screen SC to thereby detect the position pointing operation using the pointing body 70.

As the method of the detection of the pointing body 70 by the position detection unit 150, a variety of methods can be adopted. For example, it is also possible to adopt a configuration in which the pointing body 70 has a light emitting section not shown, and the light emitting section emits light when the tip of the pointing body 70 has contact with the screen SC. Further, it is also possible for the position detection unit 150 to have a configuration of analyzing the light emission position of the light emitting section of the pointing body 70 on a shot image data of an imaging section 153 described later, and calculating the coordinate of the pointed position 70A by the pointing body 70. According to this configuration, it becomes possible to detect the pointed position 70A by the pointing body 70, and presence or absence of the contact between the pointing body 70 and the screen SC. It should be noted that it is possible to adopt a configuration in which the light emitted by the light emitting section of the pointing body 70 is visible light, or the configuration in which the light is invisible light such as infrared light. In the case in which the light emitting section of the pointing body 70 emits the invisible light, it is also possible to adopt a configuration of disposing a visible light cut filter for transmitting only the infrared light in an anterior stage of the imaging section 153.

Further, it is also possible for the pointing body 70 to have a configuration of changing the blinking (lighting/extinction) pattern between the period in which the tip has contact with the screen SC and the period in which the tip does not have contact with the screen SC besides the configuration in which the light emitting section emits light when the tip has contact with the screen SC. According to this configuration, it becomes possible to detect the pointed position 70A by the pointing body 70, and presence or absence of the contact between the pointing body 70 and the screen SC. Further, according to this configuration, it becomes also possible to detect a hovering state of the pointing body 70, in which the pointing body 70 moves above the screen SC in a state having the tip of the pointing body 70 contactless with the screen SC.

The position detection unit 150 is provided with a position detection section 151 including the imaging section 153, a shooting control section 155, a receiving section 154, and a position detection processing section 157, and the coordinate calculation section 159 for calculating the coordinate of the pointed position 70A detected by the position detection section 151.

The imaging section 153 is a digital camera installed in the projector 11 so as to shoot a destination of the projection of the image light by the projection optical system 33. The field angle shot by the imaging section 153 is an imaging area 7 including the displayable area 5 on the screen SC. The imaging section 153 performs the shooting in accordance with the control by the shooting control section 155, and then outputs the shot image data. The shooting control section 155 controls the imaging section 153 to perform shooting in accordance with the control by the control section 103. In the case in which the imaging section 153 has a mechanism for adjusting the zoom magnification, the focus, and the aperture in the shooting operation, the shooting control section 155 controls the mechanism to perform shooting on the conditions set previously. After the shooting operation, the shooting control section 155 obtains the shot image data output by the imaging section 153, and then outputs the shot image data to the position detection processing section 157. The shot image data output from the imaging section 153 can also be the data expressed in the form such as RGB or YUV, or can also be the data representing only the luminance component. It is also possible to adopt a configuration in which the imaging section 153 shoots the light (e.g., infrared light) other than the visible light. Further, it is also possible for the shooting control section 155 to output the shot image data, which is output from the imaging section 153, to the position detection processing section 157 without conversion, or to output the shot image data to the position detection processing section 157 after performing the adjustment of the resolution or the conversion into a predetermined file format (e.g., JPEG and BMP).

The receiving section 154 receives a wireless signal transmitted by a transmission section 74 of the pointing body 70 to detect the operation state of the operation switch 72, and then outputs data representing the detection result to the position detection processing section 157. The position detection processing section 157 detects the pointed position 70A of the pointing body 70 based on the shot image data of the imaging section 153, and obtains the operation state of the operation switch 72 based on the data input from the receiving section 154.

It should be noted that in the case of adopting the configuration in which the imaging section 153 receives the infrared light to perform shooting, and the transmission section 74 transmits the infrared signal, the receiving section 154 can be eliminated by the position detection processing section 157 detecting the infrared signal, which has been transmitted by the transmission section 74, based on the shot image data.

The position detection processing section 157 analyzes the shot image data input from the shooting control section 155 to thereby detect the position of the tip of the pointing body 70, namely the pointed position 70A. In the present embodiment, the imaging section 153 performs shooting every predetermined time in accordance with the control by the shooting control section 155, and the position detection processing section 157 detects the pointed position 70A based on the shot image data input every predetermined time from the shooting control section 155, and then determines the pointed position 70A at the time when detecting the ON operation of the operation switch 72 as the pointed position 70A at the time when operating the operation switch 72.

The coordinate calculation section 159 calculates the coordinate of the pointed position 70A detected by the position detection processing section 157. The coordinate calculated by the coordinate calculation section 159 is the coordinate in the shot image data of the pointed position 70A, and is the coordinate in the coordinate axes virtually disposed on the display image of the screen SC. The coordinate in the shot image data is affected by a variety of factors such as the distance between the projector 11 and the screen SC, the zoom magnification in the projection optical system 33, the installation angle of the projector 11, and the distance between the imaging section 153 and the screen SC. On the other hand, since the positional relationship between the field angle of the imaging section 153 and the projection range of the projection optical system 33, the shooting magnification of the imaging section 153, the zoom ratio in the projection optical system 33, and so on are known, it is possible for the coordinate calculation section 159 to calculate the correspondence relationship between the shot image data and the displayable area 5 displayed on the screen SC. According to this process, the coordinate calculation section 159 calculates the coordinate of the pointed position 70A in the display image on the screen SC, and then outputs the coordinate data. Further, in the case in which the position detection processing section 157 detects the ON operation of the operation switch 72, the position calculation section 159 outputs the information representing the fact that the operation switch 72 is in the ON state in addition to the coordinate data of the pointed position 70A.

The coordinate data output by the coordinate calculation section 159 is input to a coordinate conversion section 160. The coordinate conversion section 160 performs the conversion of the coordinate data in accordance with the control by the control section 103. In the case of outputting the coordinate data to the PC 13, the coordinate conversion section 160 converts the coordinate data, which is input from the coordinate calculation section 159, into the coordinate data representing the coordinate in the frame of the image data to be input by the PC 13 to the image input section 104. The conversion process is performed based on the resolution of the image data input by the PC 13 to the image input section 104 and the process having been performed by the image processing section 113 on the image data. Further, in the case of outputting the coordinate data to the image processing unit 110, the coordinate conversion section 160 converts the coordinate data input from the coordinate calculation section 159 into the coordinate data representing the coordinate in the frame of the image drawn by the image processing section 113. In other words, the coordinate conversion section 160 is capable of the conversion into the coordinate corresponding to the PC 13 as the image supply section connected externally, and the image processing unit 110 as the image supply section incorporated in the projector 11, and performs the conversion into the coordinate corresponding to the image supply section as the destination of the coordinate data.

As the information necessary for the coordinate conversion section 160 in the process of converting the coordinate, there can be cited information such as the resolution and the aspect ratio of the image data of the image to be drawn by the image processing section 113, the display size in the liquid crystal display panel of the light modulation device 32, and the position at which the image is drawn in the liquid crystal display panel of the light modulation device 32. The information is output from the image processing section 113 to the coordinate conversion section 160 in response to the control of the control section 103 or the request of the coordinate conversion section 160.

In the case in which the coordinate conversion section 160 converts the coordinate so as to correspond to the image processing unit 110, the coordinate conversion section 160 outputs the coordinate data obtained by the conversion to the image processing section 113. Further, in the case in which the coordinate conversion section 160 converts the coordinate so as to correspond to the PC 13, the coordinate conversion section 160 outputs the coordinate data obtained by the conversion to an output section 101. In other words, the coordinate conversion section 160 outputs the coordinate data obtained by the conversion to the image supply section designated by the control section 103 when performing the conversion process.

The output section 101 is an interface for outputting the coordinate data, which has been obtained by the conversion process and then output by the coordinate conversion section 160, to the PC 13, and is formed of a general purpose interface such as a USB interface, a LAN interface, or IEEE 1394 interface regardless of whether wired communication or wireless communication. Here, it is also possible to integrate the image input section 104 and the output section 101 with each other to thereby realize both of the functions of the output section 101 and the image input section 104 with a physically single interface (e.g., a USB interface). A plurality of PC 13 is connected to the output section 101, and the output section 101 selects one or more of the PC 13 in accordance with the control by the control section 103, and then outputs the coordinate data to the PC 13 thus selected. Normally, the output section 101 selects the PC 13, which is supplying the image input section 104 with the image data. In the case in which there is a plurality of PC 13 each supplying the image data, the output section 101 selects one or more of the PC 13 as the output destination from among these PC13 in accordance with the control by the control section 103.

The coordinate data output by the output section 101 to the PC 13 is input in each of the PC 13 as the data similar to the coordinate data output by a pointing device such as a mouse, a trackball, a digitizer, or a pen tablet.

Further, it is also possible for the output section 101 to be connected to the image processing section 113 provided to the image processing unit 110, and output the coordinate data obtained by the conversion, which is output by the coordinate conversion section 160, to the image processing unit 110.

In the case in which the coordinate data output from the output section 101 are treated equivalently to the coordinate data output by general-purpose pointing devices in the PC 13, a general-purpose device driver program corresponding to such general-purpose pointing devices can be used. Since such a general-purpose device driver program has normally been installed in advance as a part of the operating system (OS) of the PC 13, the PC 13 can be used without further installing the device driver program.

In the case of using the general-purpose device driver program as described above, although there is an advantage that no dedicated device driver program is required, the information, which can be exchanged between the projector 11 and the PC 13, is limited to the range determined by the specification of the general-purpose device driver program. Therefore, it is also possible to install the dedicated device driver program corresponding to the projector 11 in the PC 13 to thereby process the coordinate data output by the output section 101 using the dedicated device driver program. In this case, the information which can be exchanged between the projector 11 and the PC 13 can arbitrarily be set in accordance with the specification of the dedicated device driver program.

The PC 13 draws, for example, a line and a figure based on the coordinate data input from the output section 101, then generates new image data by superimposing the line and the figure thus drawn on the image presently output to the projector 11, and then outputs the new image data to the projector 11.

The image processing section 113 draws, for example, a line or a figure so as to be superimposed on the image for display developed on the frame memory 115 based on the coordinate data input from the coordinate conversion section 160 or the output section 101, then generates the image signal for displaying the image thus drawn, and then outputs the image signal to the light modulation device drive section 119.

Thus, in the display system 10, when the user performs the position pointing operation by operating the pointing body 70, the figure and so on are drawn and displayed so as to be superimposed on the image presently displayed on the screen SC in accordance with the position where the operation is performed.

Then, the action of the projector 11 will be explained with reference to FIGS. 3, 4A through 4C, and 5A through 5E.

Figure 3:
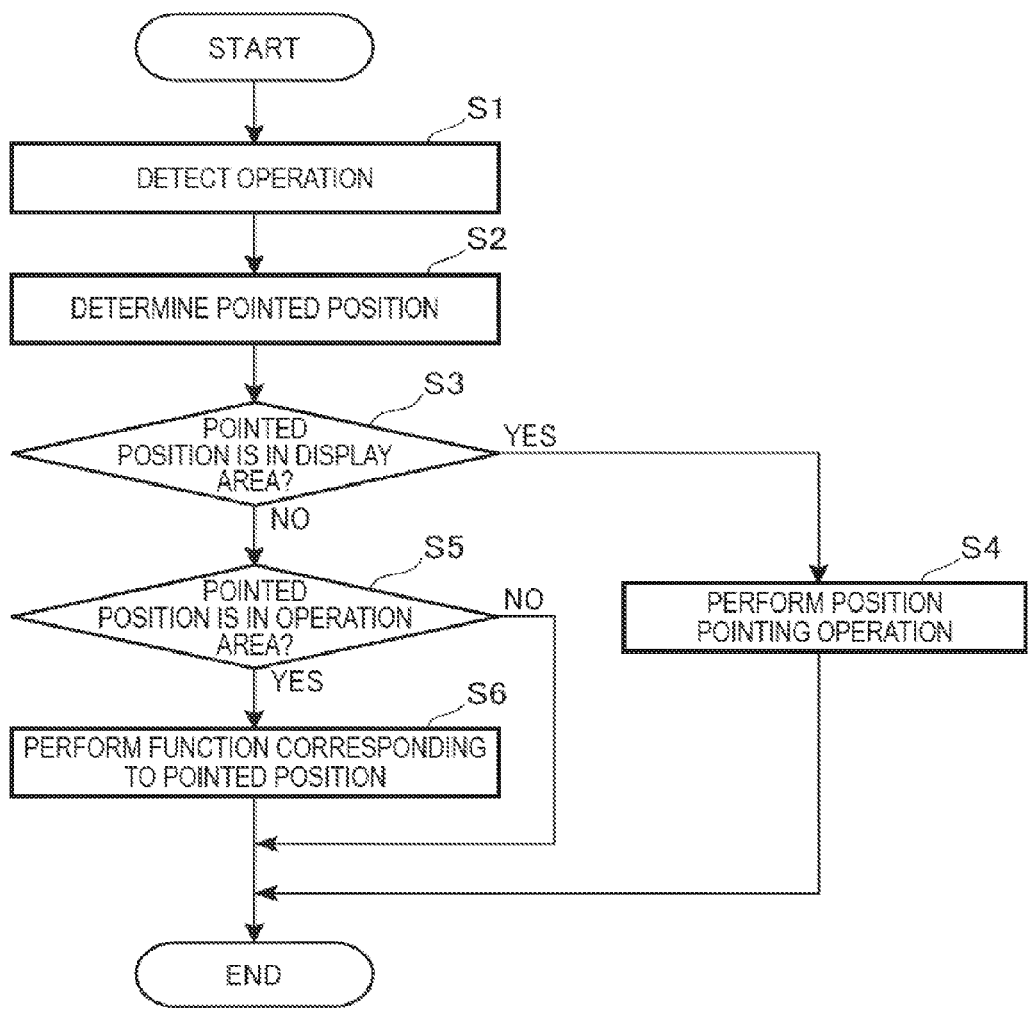
FIG. 3 is a flowchart showing an action of a display system.

FIG. 3 is a flowchart showing an action of the projector 11 when the operation of performing the function of the projector 11 is performed with the pointing body 70.

When detecting the fact that the operation state of the operation switch 72 of the pointing body 70 is in the ON state (step S1), the position detection processing section 157 analyzes the shot image data input from the shooting control section 155 to determine (step S2) the pointed position 70A by the pointing body 70, and then outputs the information related to the pointed position 70A thus determined to the control section 103.

The control section 103 determines (step S3) whether or not the pointed position 70A determined by the position detection processing section 157 is located within the display area in which the image is displayed. In the case in which it is determined that the pointed position 70A is located within the display area (YES in the step S3), the control section 103 converts the coordinate of the pointed position 70A, which is determined by the position detection processing section 157, into the coordinate corresponding to the input image data of the PC 13 due to the function of the coordinate calculation section 159 and the coordinate conversion section 160 as described above, and then outputs (step S4) the coordinate data obtained by the conversion from the output section 101 to the PC 13 to thereby make the PC 13 perform the process such as drawing corresponding to the position pointing operation.

On the other hand, in the case in which it is determined that the pointed position 70A is located out of the display area (NO in the step S3), the control section 103 determines (step S5) whether or not the pointed position 70A is located within the operation area disposed outside the display area. In the case of determining that the pointed position 70A is not located within the operation area (NO in the step S5), the control section 103 terminates the action. Further, in the case of determining that the pointed position 70A is located within the operation area (YES in the step S5), the control section 103 performs (step S6) the function of the projector 11, which has been set in advance corresponding to the operation area overlapping the pointed position 70A.

FIGS. 4A through 4C are diagrams for explaining an arrangement example of the operation area on the screen SC, and an action of controlling the display in accordance with the operation, wherein FIG. 4A shows an example related to a display switching function, FIG. 4B shows an example related to a source switching function, and FIG. 4C shows an example related to a zoom function.

In the example shown in FIG. 4A, the projector 11 performs the single picture display, and the image based on the image data input from the PC 13 is displayed in the display area 6 disposed on the displayable area 5. As described above, the displayable area 5 is an area where an image can be displayed by the projection optical system 33. In more detailed explanation, the displayable area 5 is the largest possible area for the projection optical system. 33 to display an image, or the largest possible area to display the image on which the keystone distortion correction or the pin-cushion distortion correction was performed. Although the size of the displayable area 5 varies in accordance with the zoom ratio of the projection optical system 33, the distance from the screen SC to the projection optical system 33, and the area which can be used for display in the liquid crystal panel of the light modulation device 32, the control section 103 is capable of determining the displayable area 5 by detecting the image from the shot image data of the imaging section 153.

The display area 6 for displaying an image is disposed in the displayable area 5. In the example shown in FIG. 4A, when performing the single picture display for displaying a single image on the screen SC, a single display area 6 is disposed in the displayable area 5. FIG. 4A shows an example of setting the entire displayable area 5 to the display area 6. Further, in the case of the multi-picture display for displaying images based on the image data supplied from a plurality of PC 13 side by side on the screen SC, the plurality of display areas 6A, 6B is disposed in the displayable area 5 as shown in FIG. 4B. Depending on the aspect ratio of the display areas 6A, 6B, a nondisplay area 6C where no image is displayed occurs in the displayable area 5. The nondisplay area 6C can occur not only when performing the multi-picture display shown in FIG. 4B but also when performing the single picture display.

In the periphery of the displayable area 5, there is disposed the operation area 80. The operation area 80 includes lower edge operation areas 81A, 81B disposed below the displayable area 5, side edge operation areas 82A, 82B disposed on the right side and the left side of the displayable area 5, upper edge operation areas 84A, 84B disposed above the displayable area 5, and lower corner operation areas 83A, 83B and upper corner operation areas 85A, 85B disposed outside corner portions of the displayable area 5. The operation area 80 is not actually displayed on the screen SC, but is imaginarily set by the control section 103. Further, the operation areas constituting the operation area 80 are disposed so as not to overlap each other, and not to overlap the displayable area 5, and the boundary between the displayable area 5 and the operation area 80 is not included in the operation area 80. Further, the whole of the operation area 80 is located inside the range in which the projector 11 can detect the pointed position 70A of the pointing body 70, namely inside the imaging area 7 of the imaging section 153. In the example shown in FIG. 4A, the whole of the imaging area 7 is composed of the operation area 80 and the display area 6.

In the example shown in FIG. 4A, in the case in which the position pointing operation with the pointing body 70 is performed inside the imaging area 7, the pointed position 70A belongs to either the surface of the displayable area 5 or the operation area 80. It should be noted that the operation areas constituting the operation area 80 can be disposed separately from each other, or the displayable area 5 and the operation area 80 can be disposed with a gap.

Further, in the case in which the nondisplay area 6C occurs as described above, the operation area 80 is disposed outside the nondisplay area 6C. In this case, it is also possible to display a guide (e.g., a straight line or a point) in the peripheral portion of the nondisplay area 6C so that it becomes easy for the user to recognize the boundary between the operation area 80 and the nondisplay area 6C.

It is possible to assign the functions of the projector 11 respectively to the operation areas in the operation area 80. In the case in which the pointed position 70A belongs to either of the operation areas, the control section 103 performs the function assigned to the operation area.

In the example shown in FIG. 4A, the lower edge operation areas 81A, 81B are made to correspond to the display switching function of alternately switching between the single picture display and the multi-picture display. In the case of performing the single picture display, when either of the lower edge operation areas 81A, 81B is operated with the pointing body 70, the control section 103 switches the display state to the multi-picture display. Further, in the case of performing the multi-picture display, when the lower edge operation areas 81A, 81B are operated, switching to the single picture display is performed. During the multi-picture display, the lower edge operation area 81A is made to correspond to one display area 6A, and the lower edge operation area 81B is made to correspond to the other display area 6B. Therefore, in the case in which the lower edge operation area 81A is operated, the image presently displayed in the display area 6A becomes subjected to the single picture display. Similarly, in the case in which the lower edge operation area 81B is operated, the image presently displayed in the display area 6B becomes subjected to the single picture display.

As described above, by performing a tap operation on the operation area 80 with the pointing body 70, it is possible to alternately switch between the single picture display and the multi-picture display. Further, it is possible to make each of the operation areas constituting the operation area 80 correspond to either of the display areas during the multi-picture display for displaying the images in the plurality of display areas. Thus, in the case in which the pointed position 70A overlaps the operation area, the display area corresponding to the operation area is identified, then the function corresponding to the image presently displayed in the display area thus identified is performed. In other words, it is possible to designate not only the function to be performed but also the image to be the target of the function by a single operation with the pointing body 70.

Further, as shown in FIG. 4B, it is possible to make the operation area correspond to the source switching function for switching between the image supply devices for supplying the projector 11 with the image data. In this example, the source switching function is assigned to the lower edge operation areas 81A, 81B, and in the case in which a flick operation (an operation of laterally sliding the pointing body 70) of the pointing body 70 is performed at a position overlapping the lower edge operation area 81B, the PC 13 supplying the display area 6B with the image data as the image supply device is switched to another PC 13. For example, in the case in which the flick operation is performed in the lower edge operation area 81B during the period in which the image based on the image data output by the PC13A shown in FIG. 2 is displayed in the display area 6B, the image based on the image data output by the PC 13B is displayed in the display area 6B.

In this example, the operation areas constituting the operation area 80 are made to correspond respectively to the display areas 6A, 6B. For example, the lower edge operation area 81A corresponds to the display area 6A, and the lower edge operation area 81B corresponds to the display area 6B. It is obviously possible to make other operation areas correspond to the display areas 6A, 6B.

Further, as shown in FIG. 4C, it is possible to make the operation area correspond to the operation of the zoom function for performing magnification/contraction of the image displayed by the projector 11.

In this example, the zoom function is assigned to the lower edge operation areas 81A, 81B. The zoom function requires the operation of designating whether the magnification or the contraction is performed, the operation of designating the magnification ratio or the contraction ratio, and so on. In the present embodiment, whether the magnification or the contraction is performed and the magnification ratio/contraction ratio can be designated in accordance with the operation method of the pointing body 70.

As an example of the operation method, an operation using two pointing bodies 70, 70 will be cited here as an example. By touching the operation area with the two pointing bodies 70, and then operating the two pointing bodies 70, 70 so as to come closer to each other (decease the distance between the two pointing bodies 70, 70), the image is contracted due to the zoom function, and by operating the two pointing bodies 70, 70 so as to be separated from each other (increase the distance between the two pointing bodies 70, 70), the image is magnified due to the zoom function. The magnification ratio and the contraction ratio correspond to the variation amount in the distance between the two pointing bodies 70, 70.

In the example shown in FIG. 4C, the projector 11 performs the multi-picture display, the lower edge operation area 81A corresponds to the display area 6A, and the lower edge operation area 81B corresponds to the display area 6B. In the case in which the lower edge operation area 81A is operated, the zoom function of the image in the display area 6A is performed, and in the case in which the lower edge operation area 81B is operated, the zoom function of the image in the display area 6B is performed. Further, in the case in which the operation straddling the lower edge operation area 81A and the lower edge operation area 81B is performed, both of the image in the display area 6A and the image in the display area 6B are magnified or contracted.

In the example shown in FIG. 4C, by the two pointing bodies 70, 70 being operated in the lower edge operation area 81A during the multi-picture display, the image in the display area 6A is magnified. Further, in the case in which the operation is performed so as to move the pointing body 70 on the lower edge operation area 81A and the pointing body 70 on the lower edge operation area 81B away from each other, both of the image in the display area 6A and the image in the display area 6B are magnified.

As described above, the projector 11 is capable of performing the functions assigned in advance in accordance with the operations to the operation areas, and in the multi-picture display, the target image of the function can be designated by selecting the operation areas. Further, the detailed parameters related to the execution of the function can be designated in accordance with the operation method of the pointing body 70.

The operation method of the pointing body 70 is not limited to the operation described above with the plurality of pointing bodies 70, but, for example, a combination of the plurality of times of tap operation can be cited. Further, there can also be adopted a configuration in which when the zoom function of the image is performed and the operation of magnifying the image in the display area 6A is performed in the case of performing the multi-picture display, the image in the display area 6B is contracted accordingly, and the ranges of the operation areas corresponding respectively to the display area 6A and the display area 6B are also changed in accordance with the sizes of the images.

FIGS. 5A through 5E are diagrams for explaining the arrangement example of the operation area on the screen SC, and the action of controlling the display in accordance with the operation to the operation area, wherein FIG. 5A shows an example related to a horizontal scrolling function, FIG. 5B shows an example related to a vertical scrolling function, FIG. 5C shows an example related to a mute function, FIG. 5D shows an example related to a network connection standby function, and FIG. 5E shows an example related to an operation locking/releasing function.

In the example shown in FIGS. 5A and 5B, a scrolling (display moving) function (a function of moving the position of the image presently displayed in the display area 6) of the image presently displayed in the display area 6 is assigned to the operation area. Specifically, the horizontal scrolling function is made to correspond to the lower edge operation areas 81A, 81B, and the vertical scrolling function is made to correspond to the side edge operation areas 82A, 82B. As shown in FIG. 5A, by performing the operation of horizontally moving the pointing body 70 with which the touch operation is performed inside the lower edge operation area 81A, the image displayed in the display area 6A is moved horizontally in accordance with the movement of the pointing body 70. Further, as shown in FIG. 5B, due to the operation of vertically moving the pointing body 70 with which the touch operation is performed inside the side edge operation area 82B, the image displayed in the display area 6B is moved vertically in accordance with the movement of the pointing body 70. It should be noted that although it is assumed in the present embodiment that there is adopted the configuration in which the movement of the image in the vertical direction and the movement of the image in the horizontal direction are assigned respectively to different operation areas, the configuration is not limited thereto, but there can also be adopted the configuration in which the movement of the image to the vertical direction, the horizontal direction, and oblique directions is assigned to a single operation area.

In the example shown in FIG. 5C, the mute function for deleting display image of the projector 11 is made to correspond to the operation area. Specifically, when the touch operation with the pointing body 70 is performed in the lower corner operation area 83A, the projection of the image light by the projection section 30 is stopped, and the image presently displayed in the display area 6A is deleted (display of the image stops). This function is realized by a method of setting the display in the corresponding area to all black in the liquid crystal panel of the light modulation device 32, or a method of blocking the light emitted by the illumination optical system 31. It should be noted that when the mute function is performed, there can be adopted a configuration of displaying a blue image, or a configuration of displaying an image representing the fact that the mute state is set besides the configuration of displaying all black in the display area.

In the example shown in FIG. 5D, the network connection standby function for setting the network connection between the projector 11 and the PC 13 to a standby state is made to correspond to the operation area. In the case in which the touch operation with the pointing body 70 is performed in the lower corner operation area 83A, the connection state with the PC 13 supplying the image presently displayed in the display area 6A is switched to the standby state. Since the image is not input from the PC 13 in the standby state, the image is not displayed in the display area 6A. Therefore, in order to make the reconnection to the PC 13 or other image supply devices easy, it is also possible to display a two-dimensional code including the connection information of the network in the display area 6A as shown in FIG. 5D. Further, it is also possible for the projector 11 to display specific connection information (e.g., the IP address of the projector or the SSID) necessary for the connection to the projector 11. Further, it is also possible for the projector 11 to transmit a radio wave necessary for the network connection via a wireless communication interface.

In the example shown in FIG. 5E, the operation locking/releasing function for locking the operation to the image presently displayed is made to correspond to the operation straddling a plurality of operation areas. Specifically, the operation locking function of the display area 6A is assigned to the operation of the pointing body 70 passing through the lower corner operation area 83A, and the operation locking function of the display area 6B is assigned to the operation passing through the lower corner operation area 83B. When the pointing body 70 passes from the side edge operation area 82A through the lower corner operation area 83A, and then is moved directly to the lower edge operation area 81A, the operation to the image displayed in the display area 6A is locked, and the operation is temporarily disabled. When a similar operation is performed again, the lock of the operation set with respect to the display area 6A is released, and the operation is enabled. Since these operations are distinctive, there is no possibility that the user mistakenly performs locking or releasing of the lock without the intention, and both of improvement in operability and certainty of the operation can be obtained.

Besides the above, it is also possible to, for example, assign the transition to the password-lock state in which the input picture is not displayed and the release of the state to the operation of touching the upper corner operation area 85A and then subsequently touching the lower corner operation area 83A. The password-lock state is used as a protection against theft of the projector 11, and can be released by either one of inputting the normal password with the operation of the operation panel 41 or the remote controller, and performing the operation described above once again.

Besides the examples described above, it is possible for the projector 11 to be configured so as to be capable of switching between a PJ interactive mode in which the information representing the operation position of the pointing body 70 detected by the position detection unit 150 is processed inside the projector 11, and the process based on the coordinate of the operation position is performed by the projector 11, and a PC interactive mode in which the information representing the operation position of the pointing body 70 detected by the position detection unit 150 is output to the external PC 13, and the PC 13 is made to perform the process based on the coordinate of the operation position, and have a mode switching function capable of switching between the PJ interactive mode and the PC interactive mode with the operation to the operation area 80.

Further, a variety of functions of the projector 11 such as stoppage or rotation of the image presently displayed in each of the display areas 6A, 6B, or OSD display/nondisplay of a menu screen related to the functions of the projector 11 can be assigned to the operation areas of the operation area 80. Further, by performing the assignment while combining the operation configurations to the respective operation areas with each other, it becomes possible to perform the assignment to more complicated operations to thereby prevent an erroneous operation, to make it possible to perform the setting or designation related to the content of the function to be performed, and to perform the assignment of a wide variety of functions, and therefore, the operability of the projector 11 can further be improved. It should be noted that it is also possible to adopt a configuration in which the association between at least two of the operation areas, the functions which can be performed in the operation areas, and the operations for performing the functions can be achieved by the operations on the menu screen.

Further, in the case in which the pointed position 70A is located out of the displayable area 5, the projector 11 fails to output the coordinate of the pointed position 70A to the PC 13. This is because the coordinate output to the PC 13 is the coordinate corresponding to the image data input by the PC 13, and the outside of the display area 6 corresponds to the outside of the image data. Here, in the case in which the pointed position 70A is the position corresponding to either of the operation areas of the operation area 80, it is possible for the control section 103 to transmit control data representing the operation area, or control data representing the function of the projector 11 corresponding to the operation area to the PC 13. In this case, it becomes possible to make the PC 13 perform some function in accordance with the operation to the outside of the displayable area 5 with the pointing body 70.

As explained hereinabove, since the projector 11 according to the first embodiment to which the invention is applied is provided with the projection unit 3 for displaying the image on the screen SC, the position detection unit 150 for detecting the pointed position 70A of the pointing body 70 in the screen SC, and the control section 103 for performing the functions related to the operation corresponding respectively to the operation areas 81A, 81B, 82A, 82B, . . . in the case in which the plurality of operation areas 81A, 81B, 82A, 82B, . . . are set in the outside of the display area 6 of the image in the screen SC, and the pointed position 70A is located within the operation areas 81A, 81B, 82A, 82B, . . . by performing the position pointing operation with the pointing body 70 on the screen SC, it is possible to perform the functions of the projector 11 corresponding to the operation areas. Thus, the user can operate a variety of types of functions of the projector 11 without operating the operation panel 41 of the projector 11 or the remote controller of the projector 11. Therefore, in the case of, for example, performing the operation such as drawing with the pointing body 70, the user can perform the variety of functions of the projector 11 without performing the action of changing the pointing body gripped by hand to the remote controller, and thus the improvement in operability can be achieved. Further, since the operation areas 81A, 81B, 82A, 82B, . . . are set in the outside of the display area 6, it is not required to display icons or tool bars for switching the operations inside the display area 6, the input picture is not blocked by the icons or the like and therefore, the drawing range can be increased.

Further, there is provided the image processing unit 110 for displaying the image data supplied from the plurality of PC 13 including the external device in the respective display areas 6A, 6B disposed in the screen SC using the projection unit 3, and the plurality of operation areas 81A, 81B, 82A, 82B, . . . is made to correspond to the respective display areas 6A, 6B. According to this configuration, in the case of performing the multi-picture display of displaying the images based on the image data supplied from the plurality of PC 13 side by side on the screen SC, the operations in the operation areas 81A, 81B, 82A, 82B, . . . of the screen SC are made to correspond to the respective images displayed, and therefore, it is possible to perform the functions of the projector 11 and designate the target image with the operation of the pointing body 70. Thus, the user can operate the variety of functions of the projector 11 in detail with the operation of the pointing body 70 without operating the operation panel 41 or the remote controller of the projector 11, and thus further improvement in operability can be achieved.

Further, according to the projector 11, in the case in which the operation of the pointing body 70 straddling any of the plurality of operation areas 81A, 81B, 82A, 82B, . . . is detected, the function corresponding to the operation straddling the plurality of operation areas 81A, 81B, 82A, 82B, . . . can be performed. Further, since the projector 11 is provided with the imaging section 153 for shooting the range including the display areas 6A, 6B, and the position detection unit 150 detects the pointed position 70A of the pointing body 70 based on the shot image of the imaging section 153, the operation area 80 can be set outside the displayable area 5. Thus, the operation area 80 can be disposed without decreasing the display areas 6A, 6B, and thus, the improvement in operability can be achieved without affecting the display size of the image.

Further, since the projector 11 performs at least either one of the source switching function of switching the PC 13 for supplying each of the display areas 6A, 6B with an image, the freeze function for stopping the image displayed, the mute function for deleting the image displayed, the zoom function of magnifying or contracting the image displayed, the function of changing the display position of the image displayed in the display area 6, and the function of switching between the mode of processing the information representing the operation position detected by the position detection unit 150 inside the projector 11, and the mode of outputting the information to the outside in the case in which the operation to the operation area 80 is detected by the position detection unit 150, the user can operate a variety of functions provided to the projector 11 without operating the operation panel 41 of the projector 11 or the remote controller of the projector 11.

Second Embodiment

As the second embodiment, a display system using the projector recognizing marks as patterns disposed in the operation area will be explained. It should be noted that the "pattern" is for making the area distinguishable, and is not limited to a mark (symbol), but can be a character, or a pattern or a color.

Figure 6:
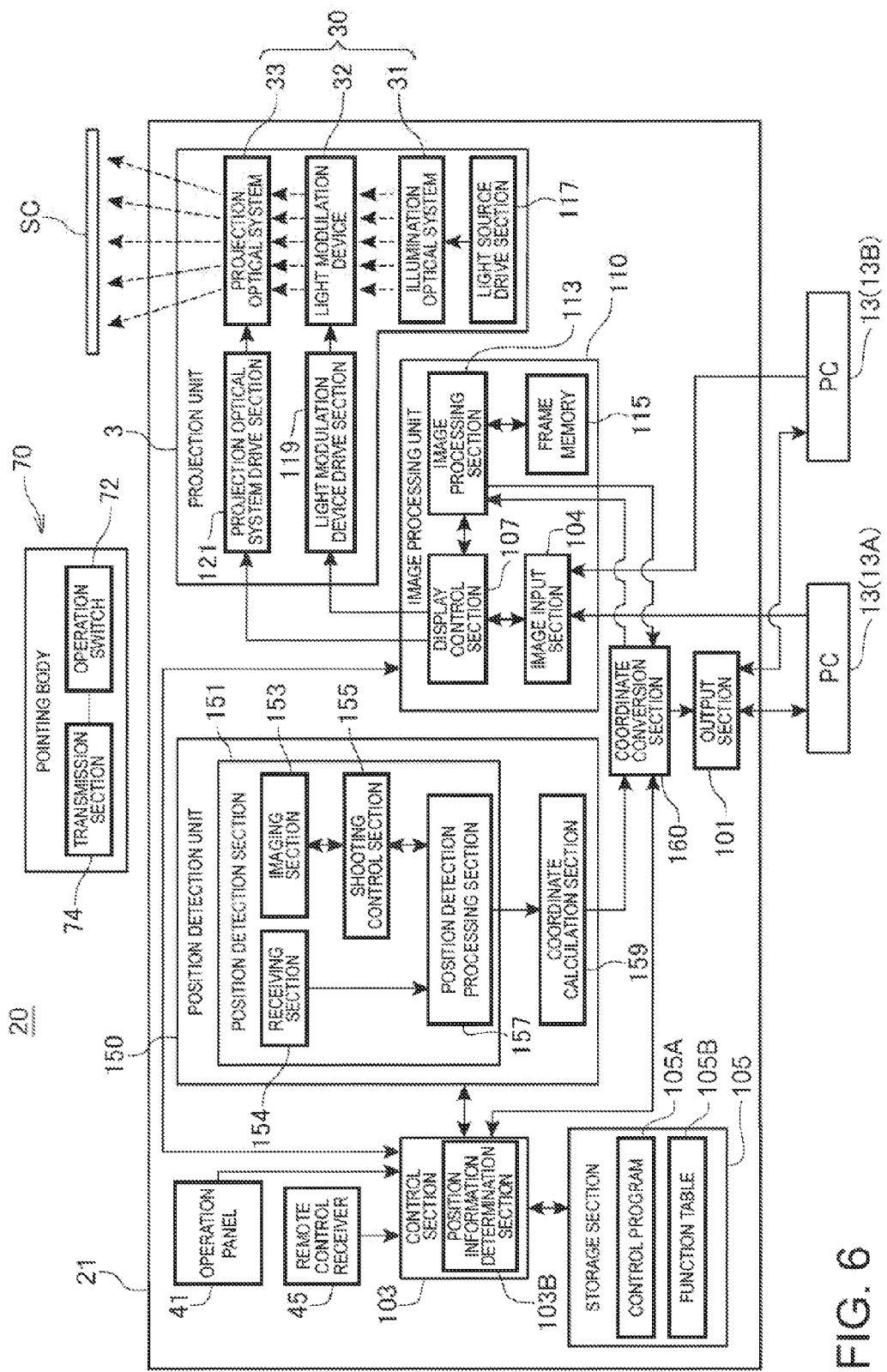
FIG. 6 is a block diagram showing a functional configuration of a display system according to a second embodiment of the invention.

FIG. 6 is a block diagram showing a functional configuration of a display system 20 according to the second embodiment.

The configuration of the display system 20 is substantially the same (see FIG. 2) as that of the display system 10 according to the first embodiment except a projector 21. Therefore, the explanation of the display system 20 other than the projector 21 will be omitted. Here, the same constituents as those of the first embodiment will be denoted with the same reference numerals.

The configuration of the projector 21 is substantially the same (see FIG. 2) as that of the projector 11 according to the first embodiment except a storage section 105. Further, the processing content performed by the position detection processing section 157 is modified with respect to the projector 11 according to the first embodiment. Therefore, the explanation of the projector 21 other than the storage section 105 and the position detection processing section 157 will be omitted. It should be noted that the projection unit 3 corresponds to a display, the position detection unit 150 corresponds to a detector, and the control section 103 corresponds to a controller.

The storage section 105 has a function table 105B as a function storage device in addition to the configuration in the first embodiment.

FIG. 7 is an explanatory diagram of the function table 105B.

The function table 105B is a table representing the correspondence between the marks disposed in the respective operation areas and the functions, and is provided to the storage section 105. As shown in FIG. 7, in the function table 105B, the functions of the projector 21 are stored so as to correspond respectively to the marks. It is arranged that the functions in the function table 105B are substantially the same as the functions provided to the projector 11 according to the first embodiment. It should be noted that the mode switching function denotes the function of switching between the mode in which the information representing the operation position detected by the position detection unit 150 is processed inside the projector 21 and the mode in which the information is output to the outside. Further, the marks are not limited to the types shown in the function table 105B shown in FIG. 7, but can have any shapes providing the marks can be recognized in the projector 21.

In the present embodiment, the correspondence between the marks and the functions in the function table 105B can be changed. Specifically, the control section 103 makes the image processing unit 110 display the menu screen of the projector 21 due to a predetermined operation. In the case in which a switch provided to the operation panel 41 or the remote controller is operated, and a function table changing item is selected in the menu screen, the projector 21 visually displays a table corresponding to the function table 105B, and then enters the function table changing mode. In the function table changing mode, when the switch provided to the operation panel 41 or the remote controller is operated, the control section 103 can change the correspondence between the marks and the functions, and then store the correspondence to the function table 105B.

Further, in the present embodiment, the correspondence between the marks and the functions in the function table 105B can be added. Specifically, in the case in which a switch provided to the operation panel 41 or the remote controller is operated, and a function table adding item is selected in the menu screen, the projector 21 visually displays a table corresponding to the function table 105B, and then enters the function table adding mode. In the function table adding mode, when the switches provided to the operation panel 41 or the remote controller are operated, the control section 103 can add the correspondence between the marks and the functions, and then store the correspondence to the function table 105B.

The marks disposed in the operation areas are detected by the position detection processing section 157 analyzing the shot image data. The position detection processing section 157 performs the process such as pattern matching to detect (recognize) the mark. The position detection processing section 157 corresponds to a pattern detector. The position detection processing section 157 informs the control section 103 of the information of the mark detected. Further, the coordinate conversion section 160 informs the control section 103 of the information of the coordinate at which the mark is detected. The control section 103 obtains the information of the corresponding function from the function table 105B based on the information of the mark. Further, the control section 103 identifies the operation area based on the information of the coordinate at which the mark has been detected. The control section 103 stores the operation area where the mark has been detected and the information of the function into the memory such as the storage section 105 while making the operation area and the information of the function correspond to each other. The position detection unit 150, the function table 105B, and the control section 103 correspond to a recognition device. The control section 103 and the storage section 105 correspond to a setting device.

It should be noted that although in the present embodiment it is assumed that the mark is detected by the position detection processing section 157 analyzing the shot image data, it is also possible to adopt a configuration in which the shot image data shot by the imaging section 153 is stored in the storage section 105 or the like, and the control section 103 analyzes the shot image data to thereby detect the mark.

Here, the detection process of the mark will be explained using a flowchart.

Figure 8:
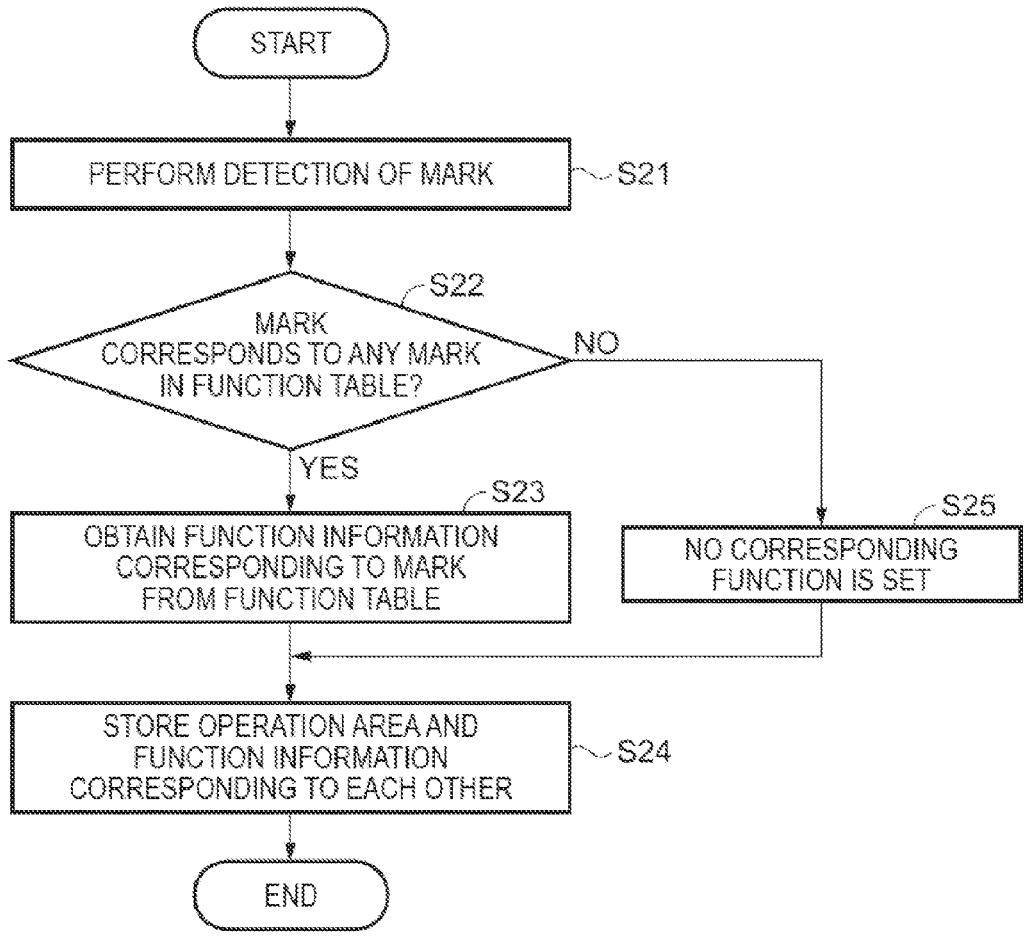
FIG. 8 is a flowchart of a mark detection process.

FIG. 8 is a flowchart of the mark detection process.

The mark detection process shown in FIG. 8 is performed at the timing when the user performs the operation of the remote controller or the operation of the operation panel 41. Further, it is also possible to periodically perform the mark detection process after the projector 21 is started up.

The shooting control section 155 outputs the shot image data, which has been taken by the imaging section 153, to the position detection processing section 157, and the position detection processing section analyzes the shot image data to perform the detection of the mark, and then informs the control section 103 of the information of the mark. Further, the coordinate conversion section 160 informs (step S21) the control section 103 of the information of the coordinate at which the mark is detected. It should be noted that in the case in which no mark exists, the information that the mark does not exist is detected. The control section 103 determines (step S22) whether or not the mark thus detected corresponds to either of the marks stored in the function table 105B.

In the case in which the mark thus detected corresponds to the mark stored in the function table 105B (YES in the step S22), the control section 103 obtains (step S23) the information of the function corresponding to the mark from the function table 105B. The control section 103 stores (step S24) the operation area based on the coordinate information and the function information corresponding to the mark into the memory of the storage section 105 while making the operation area and the function information correspond to each other. The control section 103 on this occasion corresponds to a function acquisition device.

In the case in which the mark thus detected fails to correspond to the mark stored in the function table 105B (NO in the step S22), the control section 103 determines (step S25) that there is no function corresponding to the mark thus detected. Then, the process proceeds to the step S24, and the control section 103 stores the operation area so as to correspond to no function.

Then, the process performed when performing the function of the projector 21 with the pointing body 70 will be explained using a flowchart.

Figure 9:
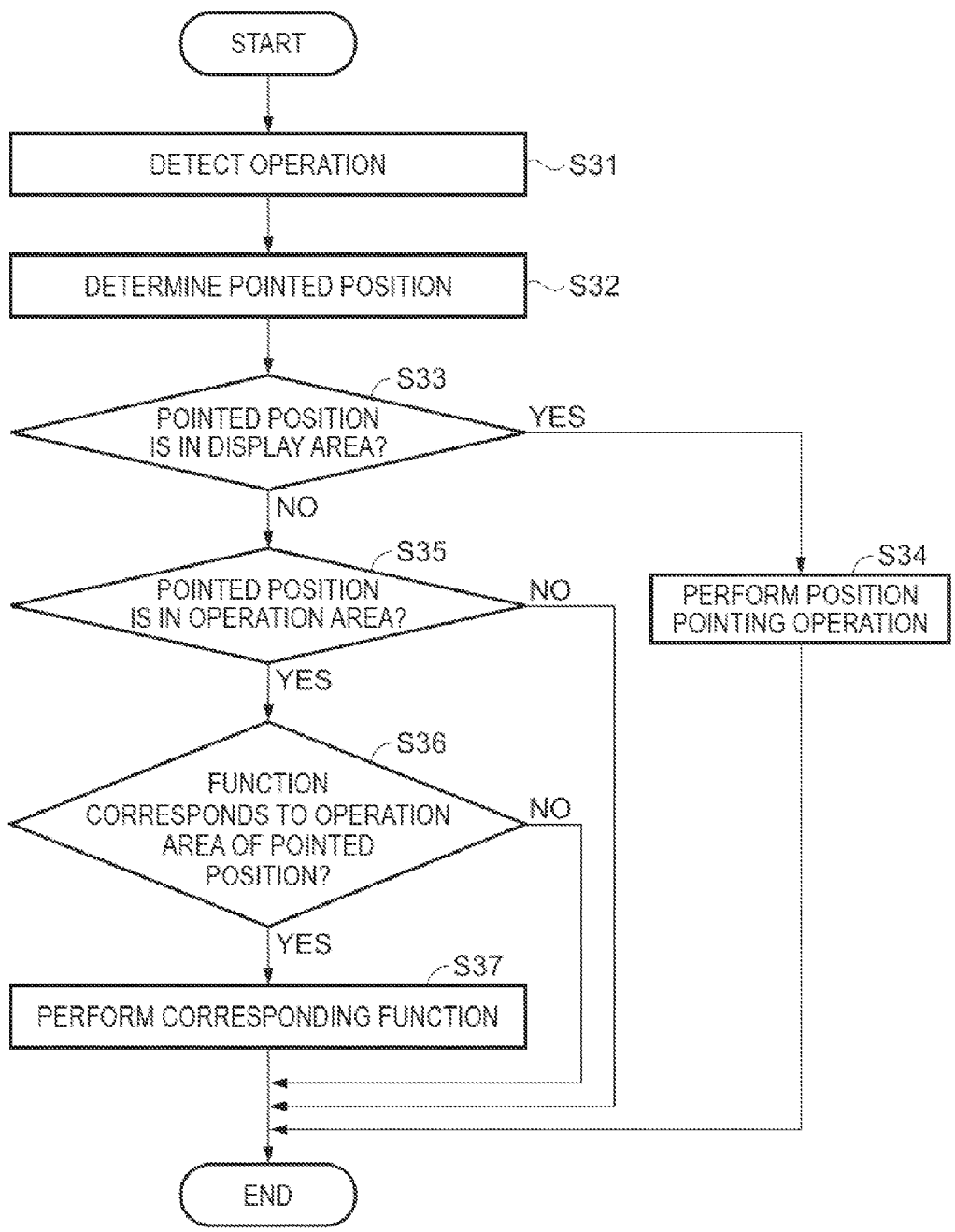
FIG. 9 is a flowchart showing an action of the projector when the operation of performing the function of the projector is performed by the pointing body.

FIG. 9 is a flowchart showing an action of the projector 21 when the operation of performing the function of the projector 21 is performed with the pointing body 70.

The steps from S31 to S35 shown in FIG. 9 are substantially the same as the steps from S1 to S5 shown in FIG. 3 in the first embodiment. Therefore, the explanation thereof will be omitted.

In the case of determining that the pointed position 70A is located within the operation area (YES in the step S35), the control section 103 determines (step S36) whether or not any function corresponds to the operation area of the pointed position 70A. In the case of determining that no function corresponds to the operation area of the pointed position 70A (NO in the step S36), the control section 103 terminates the action.

In the case of determining that a function corresponds to the operation area of the pointed position 70A (YES in the step S36), the control section 103 performs (step S37) the function of the projector 21, which corresponds to the operation area overlapping the pointed position 70A.

FIGS. 10A and 10B are diagrams for explaining an arrangement example of the operation area on the screen SC, and the action of controlling the display in accordance with the operation, wherein FIG. 10A shows an example related to the zoom function, and FIG. 4B shows an example related to the source switching function.

In the example shown in FIGS. 10A and 10B, the projector 21 performs the single picture display, and the image based on the image data input from the PC 13 is displayed in the display area 6 disposed on the displayable area 5. It should be noted that similarly to the case of the first embodiment, it is also possible for the projector 21 to perform the multi-picture display.

In the periphery of the displayable area 5, there is disposed the operation area 80. Similarly to the case of the first embodiment, the operation area 80 includes the lower edge operation areas 81A, 81B disposed below the displayable area 5, the side edge operation areas 82A, 82B disposed on the right side and the left side of the displayable area 5, the upper edge operation areas 84A, 84B disposed above the displayable area 5, and the lower corner operation areas 83A, 83B and upper corner operation areas 85A, 85B disposed outside corner portions of the display area 6.

It is possible to dispose the marks respectively to the operation areas of the operation area 80. For example, it is possible for the user to draw the marks on the screen SC with a pen such as a magic marker, or to attach a physical object made of paper or the like to the screen SC. Further, the functions of the projector 21 are assigned respectively to such marks using the function table 105B described above. In the case in which the pointed position 70A belongs to either of the operation areas, the control section 103 performs the function assigned to the operation area.

In the example shown in FIG. 10A, a triangle mark MK1 is disposed in the right side edge operation area 82B, and is corresponded to the zoom function. Further, a circle mark MK2 is disposed in the lower edge operation area 81A, and is made to correspond to the source switching function. When the right side edge operation area 82B is operated with the pointing body 70, the zoom state is varied.

Further, in the example shown in FIG. 10B, in the case in which the operation of the pointing body 70 is performed at the position overlapping the lower edge operation area 81A, the PC 13 supplying the display area 6 with the image data as the image supply device is switched to another PC 13. In other words, the source switching function is performed.

The position detection unit 150 of the projector 21 is capable of detecting not only the touch (tap) operation but also the flick operation, a swipe operation, and so on as the operation performed on the operation area with the pointing body 70. For example, it is possible to assign different action depending on the direction (a vertical direction/a horizontal direction) of the flick operation. Specifically, it is possible to, for example, increase or decrease the zooming ratio of the zoom function, and switch the source switching order of the source switching function to the ascending order of the input source or the descending order of the input source.

Further, in the PC interactive mode in which the information representing the operation position of the pointing body 70 detected by the position detection unit 150 is output to the external PC 13 and the PC 13 is made to perform the process based on the coordinate of the operation position, it is also possible to provide the PC 13 with instruction such as page feed or page back feed in accordance with the direction of the flick operation.

As explained hereinabove, the projector 21 according to the second embodiment to which the invention is applied is provided with the position detection unit 150 for detecting the marks in the operation area of the screen SC, and the control section 103 for obtaining the function information corresponding to the mark thus detected from the function table 105B and then making the mark correspond to the operation area. When the position pointing operation with the pointing body 70 is performed on the screen SC, the control section 103 performs the function of the projector 21 corresponding to the operation area. Thus, the user can operate the variety of functions of the projector 21 without operating the operation panel 41 of the projector 21 or the remote controller of the projector 21. Further, since it becomes possible for the user to visually recognize the mark and then determine the function, and then perform the operation on the operation area with the pointing body 70, the convenience is improved. In other words, since it is possible to visually check what functions are assigned to the operation areas using the marks, the usability is improved. Further, it is possible to assign the functions corresponding to the marks to the operation areas by drawing the marks in the operation areas by the user him or herself, which is advantageous.

Further, the function table 105B stores the function information corresponding to the marks. Further, the control section 103 obtains the function information corresponding to the mark detected from the function table 105B, and then assigns the function information to the operation area. Thus, in the case in which the operation is performed in the operation area on which the mark is displayed, it is possible to perform the function of the projector 21 based on the function information assigned to the operation area. Further, in the function table changing mode of the menu screen of the projector 21, by operating the switch provided to the operation panel 41 or the remote controller, the control section 103 can change the correspondence between the marks and the functions, and then store the correspondence to the function table 105B. Further, in the function table adding mode, by operating the switch provided to the operation panel 41 or the remote controller, the control section 103 can add the correspondence between the marks and the functions, and then store the correspondence to the function table 105B. It is possible to change the function table 105B in such a manner as described above, and the user can make the desired functions correspond to the desired marks, and therefore, the convenience is improved.

Further, in the case in which the operation position with the pointing body 70 is located in the operation area where no mark is detected, the control section 103 of the projector 21 performs no function assuming that no corresponding function exists. Thus, it is possible to prevent the function from being performed even in the case in which an erroneous operation with the pointing body 70 is performed in the operation area where no mark exists, which is advantageous.

It should be noted that the first and second embodiments described above are each nothing more than an example of a specific aspect to which the invention is applied, and therefore, do not limit the invention. Therefore, it is also possible to apply the invention as an aspect different from the embodiments described above. For example, the pointing body 70 can be provided with not only the configuration of using the pen-shaped operation device, but also the configuration of using a rod-shaped operation device, and the position detection processing section 157 can also be provided with a configuration of detecting the fact that the tip of the rod-shaped operation device has contact with the screen SC to thereby detect ON/OFF of the position pointing operation. Further, the pointing body 70 can also be a finger or a pointer such as a laser pointer. Further, it is also possible to adopt a configuration, which is provided with a plurality of pointing devices 70 assigned with respective functions different from each other, and is capable of operating the functions different from each other using the pointing devices 70 even by the similar operation to the same operation area. Further, it is also possible to adopt a configuration capable of operating different functions even by the similar operations to the same operation area using the combinations of the pointing devices 70 having the respective types different from each other.

Further, although it is assumed in the first and second embodiments that there is adopted a configuration in which the different operations are made to correspond respectively to a plurality of operation areas, the invention is not limited to this configuration, but there can also be adopted a configuration in which a plurality of operations is assigned to a single operation area, and the operations can be distinguished.

Further, although in the first embodiment the explanation is presented citing the source switching function of switching the image supply devices for supplying the projector 11 with the image data as an example of the switching function of switching the image presently displayed in the display area 6B or the like to another image, the switching function of the image is not limited to this example. For example, it is also possible to realize the switching function of the image by changing the image data supplied by the image supply device to the projector 11 without switching the image supply device for supplying the projector 11 with the image data.

Further, in the configuration of the first and second embodiments described above, it is also possible to substitute the imaging section 153 and the shooting control section 155 provided to the position detection unit 150 with a digital camera externally connected to the projector 11, 21. The digital camera in this case is only required to perform shooting in accordance with the control of the control section 103, and then output the shot image data to the position detection processing section 157. Further, since a general-purpose interface such as USB can be used as the interface for connecting the digital camera and the projector 11, 21 with each other, the configuration can easily be realized.

Further, it is also possible for the imaging section 153 to have a configuration capable of imaging the invisible light (e.g., infrared light), and in the case in which the invisible light can be imaged, it is possible to adopt, for example, the configuration in which the pointing body 70 emits the invisible light, and the imaging section 153 images the invisible light emitted from the pointing body 70, and the configuration in which pointing body 70 is provided with a reflecting section capable of reflecting the invisible light, and the invisible light is projected from the projector 11, 21 toward the screen SC due to the control by the control section 103, and then the invisible light reflected by the reflecting section of the pointing body 70 is imaged by the imaging section 153.

Further, although in the first and second embodiments, it is assumed that the display system 10, 20 uses the normal screen SC, it is also possible to use a screen having the marks printed in advance in the operation areas.

Figure 11:
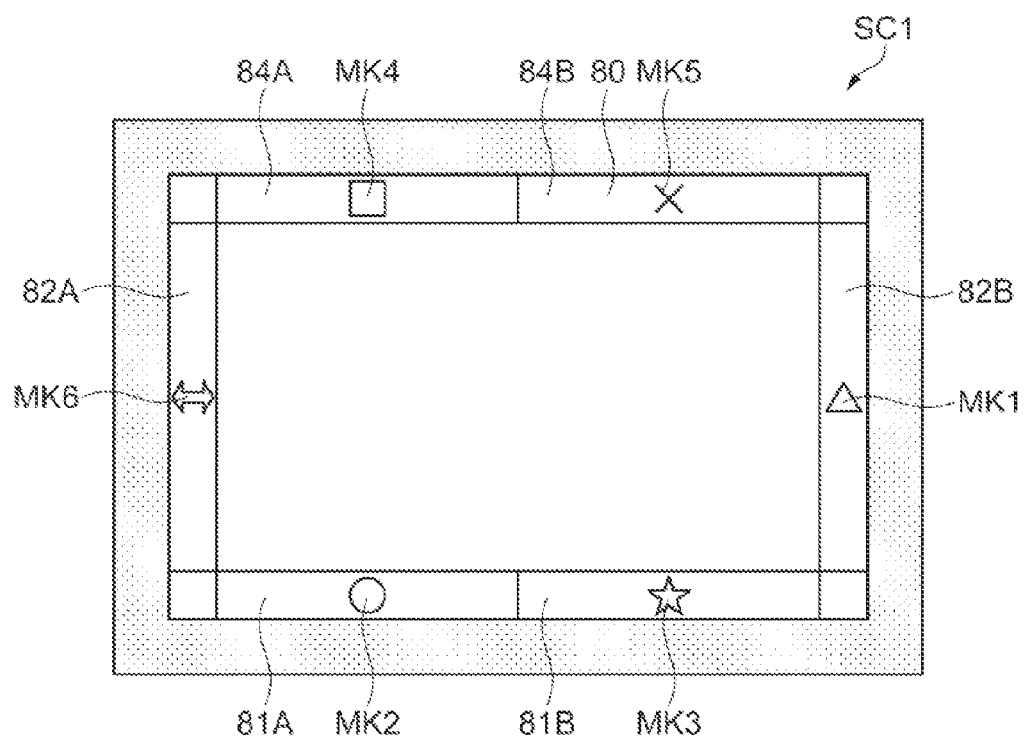
FIG. 11 is a front view of the screen on which marks are printed.

FIG. 11 is a front view of the screen on which the marks are printed.

As shown in FIG. 11, in the screen SC1 having the marks printed thereon, the variety of types of marks are printed at the positions corresponding to the operation area 80. In FIG. 11, there are printed the circle mark MK2 in the lower edge operation area 81A, a star mark MK3 in the lower edge operation area 81B, an arrow mark MK6 in the side edge operation area 82A, the triangle mark MK1 in the side edge operation area 82B, a rectangle mark MK4 in the upper edge operation area 84A, and a cross mark MK5 in the upper edge operation area 84B. By using the screen SC1 having such marks printed, in the first embodiment, it is possible for the user to operate the pointing body 70 on the operation area using the marks as markers, and make the projector 11 perform the functions assigned to the operation areas. In the second embodiment, the user can operate the pointing body 70 on the operation areas using the marks as the markers. The projector 21 recognizes the marks, and then assigns the functions corresponding to the marks to the operation areas, respectively. Therefore, by the user performing the operation on the operation area using the mark as the marker, the function corresponding to the operation area can be performed. As described above, it becomes possible for the user to visually recognize the marks and perform a desired operation. Further, the user is not required to draw the marks by him or herself. Further, the convenience when the user operates the display system is improved.

Further, the functions assigned to the operation areas in the first embodiment and the function assigned to the marks in the second embodiment are not limited to the source switching function, the zoom function, the mute function, the freeze function, the display position changing function, and the mode switching function. Any functions provided to the projector 11, 21 such as a function of rotating the image, or the function of switching between the standby mode and the normal mode can also be adopted.

Further, although in the second embodiment the marks are disposed in the right side edge operation area 82B on the screen SC and the lower edge operation area 81A, the operation areas provided with the marks are not limited to these areas. It is also possible to dispose the marks in any of the operation areas 81A, 81B, 82A, 82B, 83A, 83B, 84A, 84B, 85A, and 85B. Further, it is also possible to segmentalize the operation area 80 to dispose a lot of operation areas, and dispose the marks in the respective operation areas.

Further, in the second embodiment described above, when detecting the mark in the operation area, it is also possible to perform the function corresponding to the mark detected. For example, when the mark representing the first input source is disposed (displayed) in the operation area, it is possible for the projector 21 to perform the input source switching function to project the first input source. According to this configuration, in the single picture display and the multi-picture display, the convenience in switching the input source is improved. Further, it is also possible to adopt a configuration in which a mark representing the target of the function can be disposed in the operation area together with the mark representing the function. For example, in the case in which the mark representing the first input source exists in the operation area, when the mark corresponding to the mute function is further disposed (displayed), it is also possible that the mute function is performed with respect to the first input source, and then the mute state occurs. Such a function can also be applied to other functions of the projector.

Further, although in the first and second embodiments described above the explanation is presented citing, as an example, the configuration in which the light modulation device 32 uses the three transmissive liquid crystal panels corresponding to the respective colors of RGB as devices for modulating the light emitted by the light source, the invention is not limited to this example, but can also use the reflective liquid crystal panels, or can also be configured using a system including digital mirror devices (DMD), a system using one digital mirror device and a color wheel combined with each other, and so on. Here, in the case of using a single liquid crystal panel or DMD as the display section, the member corresponding to the combining optical system such as the cross dichroic prism is unnecessary. Further, besides the liquid crystal panel or the DMD, any configuration capable of modulating the light emitted from the light source can be adopted without problems. Further, a rear projection type projector in which the image light is projected from the rear side of the screen SC can also be adopted.

Further, the display device according to the invention is not limited to the projector for projecting the videos to the screen SC, but various display devices including a liquid crystal monitor or a liquid crystal television set for displaying images on a liquid crystal panel, a monitor device or a television receiver for displaying images on a plasma display panel (PDP), a light emitting display device such as a monitor device or the television receiver for displaying images on an organic EL display panel called an organic light-emitting diode (OLED), an organic electroluminescence (OEL), and so on can also be included in the image display device according to the invention. In this case, the liquid crystal display panel, the plasma display panel, and the organic EL display panel each correspond to a display, and the display screen thereof corresponds to the display surface.

Further, although in the configuration of the embodiments described above the explanation is presented citing the configuration as an example, in which the position detection unit 150 detects the pointed position 70A by the pointing body 70 based on the shot image data, the invention is not limited thereto, but it is also possible to adopt the configuration in which, for example, a pressure-sensitive or capacitance touch panel is provided to the screen SC as a display surface or a display screen in other display systems, and the contact of a finger of the user or a rod member as the pointing body 70 is detected by the touch panel. Further, it is also possible to adopt a method of detecting the infrared signal emitted by the pointing body to thereby identify the pointed position or a method of detecting the distances to the pointing body using a plurality of devices disposed on the screen SC to thereby identify the pointed position.

Further, each of the functional sections of the display system 10, 20 shown in FIGS. 2 and 6 is for showing the functional configuration realized by the cooperation of hardware and software, and the specific mounting configurations are not particularly limited. Therefore, it is not necessarily required to install the hardware corresponding individually to each of the functional sections, but it is obviously possible to adopt the configuration of realizing the functions of the plurality of functional sections by one processor executing the program. Further, a part of the function realized by software in the embodiments described above can also be realized by hardware, or a part of the function realized by hardware can also be realized by software. Besides the above, the specific detailed configuration of each of other sections of the display system 10, 20 including the projector 11, 21 and the PC 13 can arbitrarily be modified within the scope or the spirit of the invention.

Further, it is also possible for the projector 11, 21 to download the control program 105A, which is stored in the storage section 105 in the first and second embodiments described above, from another device connected via the communication network, and then execute the control program, or it is also possible to adopt the configuration of recording the control program 105A on a portable recording medium, retrieving each of the programs from the recording medium, and then executing the program.

What is claimed is:

1. A display device comprising:
   a projection unit having a light source and a light modulator, the projection unit being configured to project an image in a display area on a display surface, the image including a first display area and a second display area;
   a detector configured to detect an operation position movement in at least one of a plurality of operation areas located in the display surface outside of the display area of the image, the plurality of operation areas including a first operation area located adjacent the first display area and a second operation area located adjacent the second display area; and
   a controller configured to:
      perform a function in the first display area and not in the second display area when the operation position movement detected by the detector is located within the first operation area, and
      perform the function in the second display area and not in the first display area when the operation position movement detected by the detector is located within the second operation area,
   wherein the detector:
      obtains periodic images of an imaging area that includes the display area and an area outside the display area including the plurality of operation areas,
      distinguishes, based on the periodic images of the imaging area, between movements within the display area and movements outside the display area, and
      determines that a movement outside the display area is the operation position movement, and
   wherein the controller performs the function in both the first display area and the second display area when the operation position movement detected by the detector straddles the first operation area and the second operation area.

2. The display device according to claim 1, further comprising:
   a display controller configured to display image data supplied from a plurality of image supply sections including an external device respectively in a plurality of display areas disposed in the display surface using the projection unit,
   wherein the plurality of the operation areas is set so as to correspond to each of the first display area and the second display area.

3. The display device according to claim 1, wherein
   in a case in which the plurality of the operation areas is set, and the detector detects an operation straddling the first operation area and the second operation area, the function corresponding to the operation straddling the two or more of the plurality of operation areas is performed in both the first display area and the second display area.

4. The display device according to claim 1, further comprising:
an imaging device configured to shoot a range including the first display area and the second display area,
wherein the detector detects the operation position movement based on a shot image of the imaging device, and the first operation area and the second operation area are set within a shootable area of the imaging device.

5. The display device according to claim 1, further comprising:
a recognition device configured to recognize a pattern displayed in at least one of the first operation area and the second operation area; and
a setting device configured to make function information, which corresponds to the pattern recognized by the recognition device, correspond to the at least one of the first operation area and the second operation area,
wherein the controller performs a function based on the function information corresponding to the at least one of the first operation area and the second operation area in a case in which the operation position movement is located within the at least one of the first operation area and the second operation area.

6. The display device according to claim 5, wherein the recognition device includes
a pattern detector configured to detect the pattern displayed in the at least one of the first operation area and the second operation area,
a function storage configured to store the function information corresponding to the pattern, and
a function acquisition device configured to obtain the function information, which corresponds to the pattern detected by the pattern detector, from the function storage.

7. The display device according to claim 6, wherein
in a case in which the operation position movement is located within at least one of the plurality of operation areas where the pattern fails to be detected by the pattern detector, the controller avoids performing any function.

8. The display device according to claim 1, wherein
in a case in which the operation position movement in the at least one of the plurality of operation areas is detected by the detector, the controller performs at least either one of
a switching function configured to switch an image displayed in the display area to another image,
a freeze function configured to stop an image displayed,
a mute function configured to stop displaying an image,
a zoom function configured to magnify or contract an image displayed,
a function configured to change a display position of an image displayed in the display area, and
a function configured to switch between a mode of processing information representing the operation position movement detected by the detector inside the display device and a mode of outputting the information to an outside.

9. The display device according to claim 1, wherein the detector detecting operation position movement comprises the detector detecting movement in a direction parallel to the display surface.

10. The display device according to claim 1, wherein:
the position movement detected by the detector within at least one of the first operation area and the second operation area is movement that is in a direction parallel to the display surface.

11. The display device according to claim 1, wherein:
the position movement detected by the detector within the first operation area is movement that is substantially parallel to an edge of the first display area that is adjacent to the first operation area.

12. The display device according to claim 1, wherein:
operation areas included in the plurality of operation areas included in the area outside the display area substantially surround, but do not overlap, the display area.

13. A method of controlling a display device including a projection unit having a light source and a light modulator, the method comprising:
causing the projection unit to project an image in a display area on a display surface, the image including a first display area and a second display area;
detecting an operation position movement in at least one of a plurality of operation areas located in the display surface outside of the display area of the image, the plurality of operation areas including a first operation area located adjacent the first display area and a second operation area located adjacent the second display area;
performing a function in the first display area and not in the second display area when the operation position movement detected by the detector is located within the first operation area, and
performing the function in the second display area and not in the first display area when the operation position movement detected by the detector is located within the second operation area,
wherein the detecting of the operation position movement includes:
obtaining periodic images of an imaging area that includes the display area and an area outside the display area including the plurality of operation areas,
distinguishing, based on the periodic images of the imaging area, between movements within the display area and movements outside the display area, and
determining that a movement outside the display area is the operation position movement, and
wherein the performing of the function includes performing the function in both the first display area and the second display area when the detected operation position movement straddles the first operation area and the second operation area.

14. The method of controlling a display device according to claim 13, further comprising:
recognizing a pattern displayed in at least one of the first operation area and the second operation area; and
making function information, which corresponds to the pattern recognized in the recognizing of the pattern, correspond to the at least one of the first operation area and the second operation area,
wherein in the performing the function, a function based on the function information corresponding to the at least one of the first operation area and the second operation area is performed in a case in which the operation position movement is located within the at least one of the first operation area and the second operation area.

* * * * *